US011372860B2

(12) United States Patent
Heimel et al.

(10) Patent No.: US 11,372,860 B2
(45) Date of Patent: *Jun. 28, 2022

(54) PROCESSING TECHNIQUES FOR QUERIES WHERE PREDICATE VALUES ARE UNKNOWN UNTIL RUNTIME

(71) Applicant: Snowflake Inc., Bozeman, MT (US)

(72) Inventors: Max Heimel, Berlin (DE); Ismail Oukid, Berlin (DE); Linnea Passing, Berlin (DE); Stefan Richter, Berlin (DE); Juliane K. Waack, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,796

(22) Filed: Aug. 31, 2021

(65) Prior Publication Data
US 2021/0397619 A1    Dec. 23, 2021

Related U.S. Application Data

(63) Continuation-in-part of application No. 17/358,154, filed on Jun. 25, 2021, now Pat. No. 11,308,089.
(Continued)

(51) Int. Cl.
*G06F 16/24* (2019.01)
*G06F 16/2455* (2019.01)
(Continued)

(52) U.S. Cl.
CPC .... *G06F 16/24557* (2019.01); *G06F 16/2272* (2019.01); *G06F 16/283* (2019.01); *G06F 16/9035* (2019.01); *G06F 17/18* (2013.01)

(58) Field of Classification Search
CPC ............. G06F 16/283; G06F 16/2272; G06F 16/24557; G06F 16/9035; G06F 17/18;
(Continued)

(56) References Cited

U.S. PATENT DOCUMENTS 4,956,774 A * 9/1990 Shibamiya .......... G06F 16/9017
707/E17.037
6,154,572 A   11/2000 Chaddha
(Continued)

FOREIGN PATENT DOCUMENTS

| CN | 113051351 A | 6/2021 |
|---|---|---|
| EP | 2434417 A1 | 3/2012 |
| WO | WO-2021/133433 A1 | 7/2021 |

OTHER PUBLICATIONS

"U.S. Appl. No. 16/727,315, Examiner Interview Summary dated Jun. 2, 2020", 3 pgs.
(Continued)

*Primary Examiner* — Merilyn P Nguyen
(74) *Attorney, Agent, or Firm* — Schwegman Lundberg & Woessner, P.A.

(57) ABSTRACT

A query directed at a table organized into a set of batch units is received. The query comprises a predicate for which values are unknown prior to runtime. A set of values for the predicate are determined based on the query. An index access plan is created based on the set of values. Based on the index access plan, the set of batch units are pruned using a pruning index associated with the table. The pruning index comprises a set of filters that index distinct values in each column of the table. The pruning of the set of batch units comprises identifying a subset of batch units to scan for data that satisfies the query. The subset of batch units of the table are scanned to identify data that satisfies the query.

30 Claims, 14 Drawing Sheets

Related U.S. Application Data which is a continuation of application No. 17/161,115, filed on Jan. 28, 2021, now Pat. No. 11,086,875, which is a continuation of application No. 16/932,462, filed on Jul. 17, 2020, now Pat. No. 10,942,925, which is a continuation of application No. 16/727,315, filed on Dec. 26, 2019, now Pat. No. 10,769,150.

(51) Int. Cl.
*G06F 16/9035* (2019.01)
*G06F 16/28* (2019.01)
*G06F 17/18* (2006.01)
*G06F 16/22* (2019.01)

(58) Field of Classification Search
CPC .............. G06F 16/221; G06F 16/2255; G06F 16/2455; G06F 16/2453; G06F 16/2456; G06F 16/24542; G06F 16/24553
See application file for complete search history.

(56) References Cited

U.S. PATENT DOCUMENTS

| | | | |
|---|---|---|---|
| 6,374,232 | B1 | 4/2002 | Dageville et al. |
| 6,957,225 | B1 | 10/2005 | Zait et al. |
| 7,171,427 | B2 | 1/2007 | Witkowski et al. |
| 7,814,104 | B2 | 10/2010 | Raghavan et al. |
| 7,962,521 | B2* | 6/2011 | Brown ................ G06F 16/2272 707/602 |
| 7,970,756 | B2 | 6/2011 | Beavin et al. |
| 8,666,976 | B2 | 3/2014 | Merz |
| 9,223,850 | B2 | 12/2015 | Chen |
| 9,507,825 | B2 | 11/2016 | Baer et al. |
| 9,514,187 | B2 | 12/2016 | Ziauddin |
| 9,684,671 | B1* | 6/2017 | Dorin ..................... G06F 16/33 |
| 10,025,823 | B2 | 7/2018 | Das et al. |
| 10,628,418 | B2 | 4/2020 | Weyerhaeuser et al. |
| 10,635,671 | B2* | 4/2020 | Sheng ............... G06F 16/24537 |
| 10,685,052 | B2 | 6/2020 | Winther |
| 10,705,809 | B2 | 7/2020 | Makkar |
| 10,769,150 | B1 | 9/2020 | Cruanes et al. |
| 10,838,963 | B2 | 11/2020 | Brodt et al. |
| 10,860,832 | B2 | 12/2020 | Wang |
| 10,942,925 | B1 | 3/2021 | Cruanes et al. |
| 10,997,179 | B1 | 5/2021 | Cruanes et al. |
| 11,016,975 | B1 | 5/2021 | Cruanes et al. |
| 11,074,261 | B1* | 7/2021 | Pandis ................ G06F 16/9535 |
| 11,086,875 | B2 | 8/2021 | Cruanes et al. |
| 11,176,133 | B2* | 11/2021 | Horn ................. G06F 16/24537 |
| 2004/0243816 | A1 | 12/2004 | Hacigumus et al. |
| 2005/0198076 | A1 | 9/2005 | Stata et al. |
| 2009/0070303 | A1 | 3/2009 | Beavin et al. |
| 2010/0125594 | A1 | 5/2010 | Li et al. |
| 2010/0281017 | A1 | 11/2010 | Hu et al. |
| 2010/0318519 | A1 | 12/2010 | Hadjieftheriou et al. |
| 2011/0213775 | A1 | 9/2011 | Franke et al. |
| 2013/0166553 | A1 | 6/2013 | Yoon et al. |
| 2013/0166557 | A1 | 6/2013 | Fricke et al. |
| 2014/0114942 | A1 | 4/2014 | Belakovskiy et al. |
| 2014/0365424 | A1 | 12/2014 | Herbst et al. |
| 2015/0286681 | A1 | 10/2015 | Baer et al. |
| 2016/0026667 | A1 | 1/2016 | Mukherjee et al. |
| 2016/0162364 | A1 | 6/2016 | Mutha et al. |
| 2016/0196306 | A1* | 7/2016 | Beavin ................ G06F 16/2255 707/714 |
| 2016/0350347 | A1* | 12/2016 | Das ........................ G06F 12/023 |
| 2016/0350375 | A1* | 12/2016 | Das .................... G06F 16/2456 |
| 2016/0350392 | A1 | 12/2016 | Rice et al. |
| 2017/0060944 | A1 | 3/2017 | Khayyat et al. |
| 2017/0116136 | A1 | 4/2017 | Macnicol et al. |
| 2017/0116271 | A1 | 4/2017 | Ziauddin et al. |
| 2017/0139989 | A1 | 5/2017 | Weyerhaeuser et al. |
| 2018/0068008 | A1 | 3/2018 | Cruanes et al. |
| 2018/0113889 | A1 | 4/2018 | Brodt |
| 2018/0285418 | A1* | 10/2018 | Petropoulos ........ G06F 16/3332 |
| 2019/0130250 | A1 | 5/2019 | Park et al. |
| 2019/0220464 | A1* | 7/2019 | Butani .............. G06F 16/24542 |
| 2019/0303270 | A1 | 10/2019 | Hoermann |
| 2019/0332722 | A1 | 10/2019 | Ogren et al. |
| 2020/0026788 | A1 | 1/2020 | Bellamkonda et al. |
| 2020/0373946 | A1 | 11/2020 | Lee et al. |
| 2021/0200772 | A1 | 7/2021 | Cruanes et al. |
| 2021/0216555 | A1 | 7/2021 | Cruanes et al. |
| 2021/0319025 | A1 | 10/2021 | Cruanes et al. |

OTHER PUBLICATIONS

"U.S. Appl. No. 16/727,315, Non Final Office Action dated Mar. 2, 2020".

"U.S. Appl. No. 16/727,315, Notice of Allowance dated Jun. 8, 2020", 9 pgs.

"U.S. Appl. No. 16/727,315, Response Filed May 27, 2020 to Non Final Office Action dated Mar. 2, 2020".

"U.S. Appl. No. 16/932,462, Examiner Interview Summary dated Nov. 25, 2020", 3 pgs.

"U.S. Appl. No. 16/932,462, Non Final Office Action dated Aug. 21, 2020", 11 pgs.

"U.S. Appl. No. 16/932,462, Notice of Allowance dated Dec. 15, 2020", 9 pgs.

"U.S. Appl. No. 16/932,462, Response filed Nov. 23, 2020 to Non Final Office Action dated Aug. 21, 2020", 12 pgs.

"U.S. Appl. No. 17/086,228, Non Final Office Action dated Dec. 28, 2020", 12 pgs.

"U.S. Appl. No. 17/086,228, Notice of Allowance dated Jan. 22, 2021", 7 pgs.

"U.S. Appl. No. 17/086,228, Response filed Jan. 4, 2021 to Non Final Office Action dated Dec. 28, 2020", 8 pgs.

"U.S. Appl. No. 17/086,239, Non Final Office Action dated Dec. 17, 2020", 15 pgs.

"U.S. Appl. No. 17/086,239, Notice of Allowance dated Apr. 9, 2021", 15 pgs.

"U.S. Appl. No. 17/086,239, Response filed Mar. 17, 2021 to Non Final Office Action dated Dec. 17, 2020", 12 pgs.

"U.S. Appl. No. 17/161,115, Corrected Notice of Allowability dated Jun. 24, 2021", 2 pgs.

"U.S. Appl. No. 17/161,115, Final Office Action dated Apr. 28, 2021", 17 pgs.

"U.S. Appl. No. 17/161,115, Non Final Office Action dated Mar. 23, 2021", 19 pgs.

"U.S. Appl. No. 17/161,115, Notice of Allowance dated May 12, 2021", 8 pgs.

"U.S. Appl. No. 17/161,115, Response filed Apr. 15, 2021 to Non Final Office Action dated Mar. 23, 2021", 12 pgs.

"U.S. Appl. No. 17/161,115, Response filed Apr. 30, 2021 to Final Office Action dated Apr. 28, 2021", 8 pgs.

"U.S. Appl. No. 17/218,962, Corrected Notice of Allowability dated Jul. 12, 2021", 2 pgs.

"U.S. Appl. No. 17/218,962, Non Final Office Action dated Jun. 4, 2021", 21 pgs.

"U.S. Appl. No. 17/218,962, Notice of Allowance dated Jul. 2, 2021", 8 pgs.

"U.S. Appl. No. 17/218,962, Response filed Jun. 10, 2021 to Non Final Office Action dated Jun. 4, 2021", 9 pgs.

"European Application Serial No. 20216097.4, Extended European Search Report dated May 20, 2021", 7 pgs.

"International Application Serial No. PCT/US2020/044199, International Search Report dated Aug. 26, 2020", 2 pgs.

"International Application Serial No. PCT/US2020/044199, Written Opinion dated Aug. 26, 2020", 6 pgs.

"International Application Serial No. PCT/US2021/070808, International Search Report dated Jul. 26, 2021", 2 pgs.

"International Application Serial No. PCT/US2021/070808, Written Opinion dated Jul. 26, 2021", 3 pgs.

U.S. Appl. No. 16/727,315 U.S. Pat. No. 10,769,150, filed Dec. 26, 2019, Pruning Indexes to Enhance Database Query Processing.

U.S. Appl. No. 16/932,462 U.S. Pat. No. 10,942,925, filed Jul. 17, 2020, Database Query Processing Using a Pruning Index.

(56) References Cited

OTHER PUBLICATIONS

U.S. Appl. No. 17/161,115 U.S. Pat. No. 11,086,875, filed Jan. 28, 2021, Database Query Processing Using a Pruning Index.

U.S. Appl. No. 17/358,154, filed Jun. 25, 2021, Pruning Index Maintenance.

"U.S. Appl. No. 17/358,154, Corrected Notice of Allowability dated Mar. 2, 2022", 2 pgs.

"U.S. Appl. No. 17/358,154, Notice of Allowance dated Feb. 14, 2022", 9 pgs.

"U.S. Appl. No. 17/358,154, Response filed Jan. 17, 2022 to Non Final Office Action dated Oct. 20, 2021", 11 pgs.

"U.S. Appl. No. 17/358,154, Non Final Office Action dated Oct. 20, 2021", 24 pgs.

* cited by examiner

| PARTITION# | ... | BLOOM[0] (8 BYTES) | ... | BLOOM[N] (8 BYTES) |
|---|---|---|---|---|
| P000 | ... | 00101 | ... | 0101 |
| P002 | ... | 10010 | ... | 1310 |
| ... | ... | ... | ... | |
| P1001 | ... | 00101 | ... | 0013 |
| P1001 | ... | 10010 | ... | 1300 |

FIG. 5

PROCESSING TECHNIQUES FOR QUERIES WHERE PREDICATE VALUES ARE UNKNOWN UNTIL RUNTIME

PRIORITY CLAIM

This application is a continuation-in-part of U.S. patent application Ser. No. 17/358,154, entitled "PRUNING INDEX MAINTENANCE," which is a continuation of U.S. Pat. No. 11,086,875, entitled "DATABASE QUERY PROCESSING USING A PRUNING INDEX," which is a continuation of U.S. Pat. No. 10,942,925, entitled "DATABASE QUERY PROCESSING USING A PRUNING INDEX," filed on Jul. 17, 2020, which is a continuation of U.S. Pat. No. 10,769,150, entitled "PRUNING INDEXES TO ENHANCE DATABASE QUERY PROCESSING," filed on Dec. 26, 2019, all of which are incorporated herein by reference in their entirety.

TECHNICAL FIELD

Embodiments of the disclosure relate generally to databases and, more specifically, to using a pruning index to process queries where values for one or more predicates are unknown until runtime.

BACKGROUND

When certain information is to be extracted from a database, a query statement may be executed against the database data. A database system processes the query and returns certain data according to one or more search conditions that indicate what information should be returned by the query. The database system extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

FIG. 5 illustrates a portion of an example pruning index, in accordance with some embodiments.

DETAILED DESCRIPTION

Figure 1:
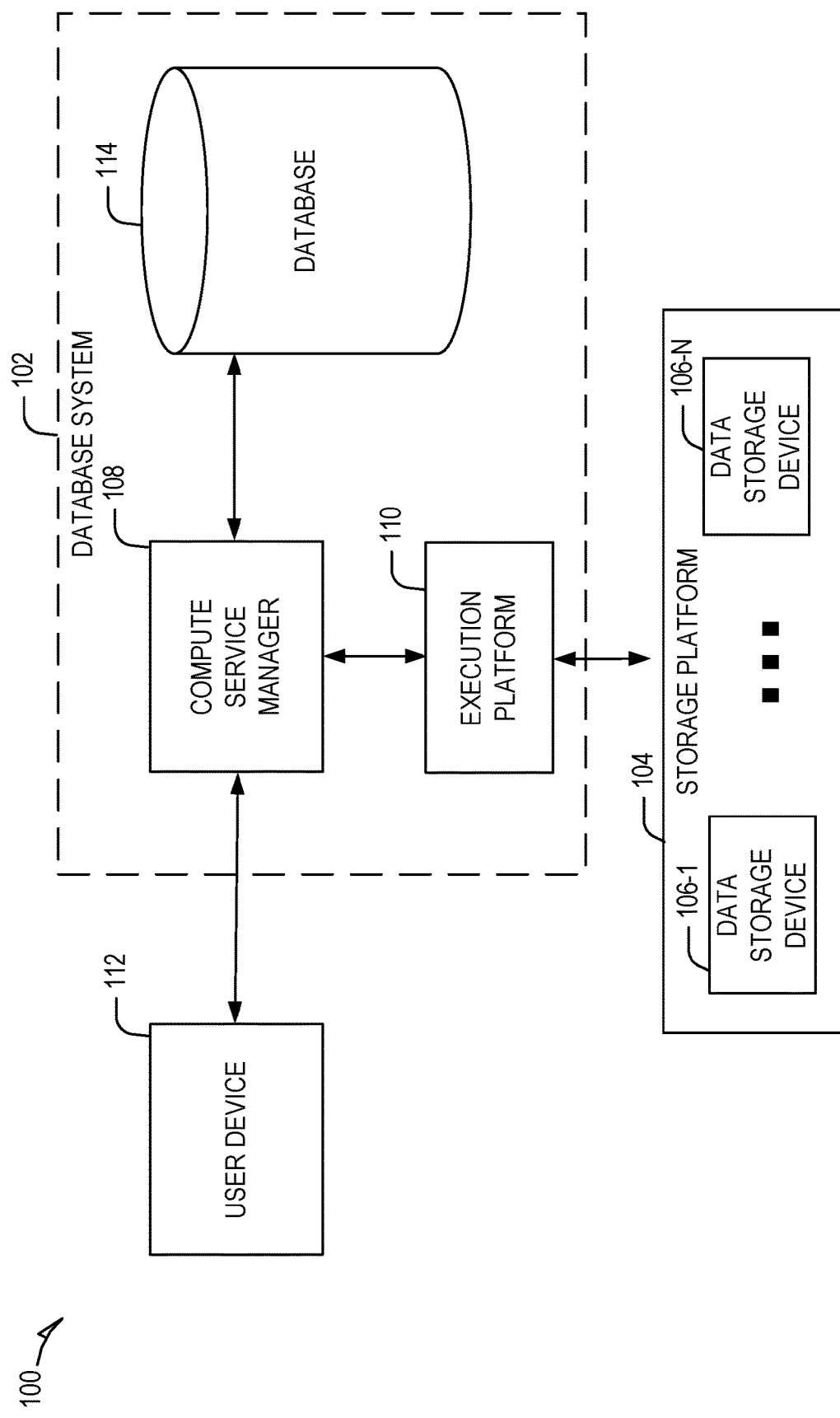
FIG. 1 illustrates an example computing environment that includes a network-based database system in communication with a cloud storage provider system, in accordance with some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, processing queries directed to very large tables is challenging because a significant amount of time and computing resources are required to scan an entire table to identify data that satisfies the query. Therefore, it can be desirable to execute a query without scanning the entire table. Aspects of the present disclosure address the above and other challenges in processing queries on large tables by creating a pruning index that may be used to construct a reduced scan set for processing a query. More specifically, a large source table may be organized into a set of batch units such as micro-partitions, and a pruning index can be created for the source table to be used in identifying a subset of the batch units to scan to identify data that satisfies the query.

It is common for data to be stored by database systems in semi-structured formats, which can store objects of any kind such as numbers, strings, timestamps, or the like. Accordingly, the pruning indexes described herein are configured to support primitive data types (e.g., STRING, NUMBER, or the like) as well as such semi-structured and complex (e.g., ARRAY and OBJECT) data types.

Consistent with some embodiments, a network-based database system generates a pruning index for a source table and uses the pruning index to prune micro-partitions of the source table when processing queries directed to the source table. The pruning index includes a probabilistic data structure that stores fingerprints for all searchable values in a source table. The fingerprints are based on hashes computed based on searchable values in the source table. To support semi-structured data type values, hashes can be computed over indexing transformations of searchable values. That is, for each semi-structured data type value, one or more indexing transformations are generated and the fingerprints are generated based on hashes computed over the one or more indexing transformations. An indexing transformation is generated by converting a semi-structured data value to a primitive data type. To support partial matching queries, fingerprints can be generated by computing a hash over a set of N-grams generated based on a searchable value, in some embodiments.

In generating a pruning index, the network-based database system uses the fingerprints to generate a filter for each micro-partition of the source table that indexes distinct values (or distinct N-grams of searchable values) in each column of the micro-partition of the source table. The filter may, for example, comprise a blocked bloom filter, a bloom filter, a hash filter, or a cuckoo filter.

For a given query, the pruning index can be used to quickly disqualify micro-partitions that are certain to not include data that satisfies the query. When a query is received, rather than scanning the entire source table to identify matching data, the network-based database system probes the pruning index to identify a reduced scan set of micro-partitions comprising only a subset of the micro-partitions of the source table, and only the reduced scan set of micro-partitions is scanned when executing the query.

The database system can use a pruning index that supports both structured and semi-structured data types to prune a scan set for queries with equality predicates (e.g., "="), queries with pattern matching predicates (e.g., LIKE, ILIKE, CONTAINS, STARTSWITH, ENDSWITH, etc.), and queries where values for predicates are unknown prior to runtime. As discussed herein, a "predicate" can comprise an expression (e.g., a SQL expression) that evaluates a search condition that is either TRUE, FALSE, or UNKNOWN. For a given equality predicate, the database system uses the pruning index to identify a subset of micro-partitions to scan for data that matches an entire string or other searchable value. For a given pattern matching predicate, the database system uses the pruning index to identify a set of micro-partitions to scan for data that matches a specified search pattern, which can include one or more partial strings and one or more wildcards (e.g., "%" or "_") used to represent wildcard character positions in the pattern (e.g., character positions whose underlying value is unconstrained by the query).

For certain types of queries, values for a predicate may only become available at runtime (i.e., after query compilation is complete, during the query execution). Examples of these types of queries include queries with join clauses (also referred to simply as "join queries"), queries that include sub-queries. The join clause is a means for combining columns from one or more tables by using values common to each of the one or more tables. In general, a join is an operation in query processing that determines rows in two inputs that "match" with respect to some of their attributes, which are referred to as join keys. Join operations are typically very time-consuming operations during query execution.

A hash join is an example of a join algorithm that may be used in the implementation of a relational database management system. Various forms of hash joins are commonly used in database systems to compute the result of a join. Hash joins build one or more multiple hash tables with rows of one of the inputs (typically the smaller input) referred to as the "build side" input. The rows are probed from the other input (typically the larger input) referred to as the "probe side" input and into the hash tables.

Join pruning is a conventional pruning technique used for processing join queries. With join pruning, a data structure (e.g., a range bloom filter) representing a synopsis of values from the build side table is sent to a probe-side scan operator, and micro-partitions are pruned using per-partition metadata that includes the minimum and maximum value per column and micro-partition before the micro-partitions are scanned. By comparing this min-max span to the values that have been sent over to the scan operator, the system can identify and disregard micro-partitions that cannot contain matching tuples because the min-max span does not contain the values being searched for. However, false-positives are a significant problem with join pruning. That is, join pruning techniques can fail to prune micro-partitions that do not contain matching tuples values because: (1) only the minimum and maximum values are considered without considering information about the presence or absence of tuples with values within the min-max span; and (2) range bloom filters are compared to the metadata rather than individual values. Generally, join pruning only works well if the probe side table is more or less clustered by the join column. If it is not, the min-max span of every micro-partition will approximately encompass the whole data domain, thereby significantly reducing the number of micro-partitions that can be pruned because the values being searched will most likely fall within the span. Accordingly, it would be advantageous to instead utilize pruning indexes for join queries and any other queries for which values for predicates are unknown prior to runtime.

To utilize a pruning index for these types of queries, the network database system collects a set of values for a query predicate at runtime and creates an index access plan based on the set of values. The system can use a pruning index associated with a table to which the query is directed to identify the reduced scan set of micro-partitions based on the index access plan, and only the reduced scan set is scanned for data that satisfies the predicate.

In the specific example of a join query to combine rows from two tables, the system can collect the set of values for the query predicate during a join build phase in which a hash table is created in which rows from a first table (also referred to as the "build side table") are stored using the join attribute(s) as the hash key. The collected values are used in conjunction with a pruning index associated with a second table (also referred to as the "probe side table") to identify the reduced scan set micro-partitions. The system performs the join probe phase using the reduced scan set of micro-partitions.

Consistent with some embodiments, use of a pruning index in processing a given query can be conditional and whether to use the pruning index can be decided dynamically at runtime. That is, a cost function can be used to evaluate use of a pruning index for a given query, and if the cost is too high (e.g., above a predetermined cost value threshold), the pruning index is not used. As an example, use of a pruning index can be based on the number of micro-partitions in the table to which a pruning index is associated. As another example, use of a pruning index can be based on the number of values for a given predicate. Accordingly, prior to creating the index access plan, the system may determine whether the number of micro-partitions in the table satisfies a threshold constraint, whether the number of values in the set of values satisfies a threshold constraint, or both. If such a threshold constraint is not satisfied, the system does not use the pruning index for pruning and may utilize an alternative pruning mechanism such as join pruning.

Use of pruning indexes at runtime in processing queries in which predicate values are unknown until runtime can improve the speed at which the queries are executed while also reducing costs as it pertains to use of computational resources. Moreover, this approach allows for more flexibility. For example, this approach would allow work to be redistributed between worker nodes and thus reduce idle times caused by data skew. Generally, techniques for runtime use of pruning indexes allow the benefits of pruning indexes to be extended to a wider set of queries.

By using a pruning index to prune the set of micro-partitions to scan in executing a query, the database system accelerates the execution of point queries on large tables when compared to conventional methodologies. Using a pruning index in this manner also guarantees a constant overhead for every searchable value on the table. Additional benefits of pruning index utilization include, but are not limited to, an ability to support multiple predicate types, an ability to quickly compute the number of distinct values in a table, and the ability to support join pruning.

In addition, by utilizing indexing transformations when building the pruning index, query predicates on semi-structured fields can be supported. Contrary to conventional approaches, this approach does not require manual selection of semi-structured data fields to be indexed. Further, unlike conventional approaches, this approach does not use any additional storage or concepts such as virtual columns or generated columns to store the fields to be indexed. Also, the pruning indexes described herein support indexing and matching against predicates regardless of how nested or evolving the structure of the input data is. Moreover, this approach does not enforce any data type restrictions on the semi-structured data fields and the values in the predicate. Finally, the generation of the pruning index involves cast-sensitive indexing of individual semi-structured data type fields, meaning that each input record can be attempted to be converted to relevant data types to match with casting behavior of semi-structured data type columns.

As discussed herein, a "micro-partition" is a batch unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

FIG. 1 illustrates an example computing environment 100 that includes a database system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 102 and a storage platform 104 (e.g., AWS®, Microsoft Azure Blob Storage®, or Google Cloud Storage®). The database system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the database system 102.

The database system 102 comprises a compute service manager 108, an execution platform 110, and a database 114. The database system 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the database system 102. The compute service manager 108 also performs query optimization and compilation as well as managing clusters of compute services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the database system 102. In some embodiments, the compute service manager 108 does not receive any direct communications from the user device 112 and only receives communications concerning jobs from a queue within the database system 102.

The compute service manager 108 is also coupled to database 114, which is associated with the data stored in the computing environment 100. The database 114 stores data pertaining to various functions and aspects associated with the database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

For example, the database 114 can include one or more pruning indexes. The compute service manager 108 may generate a pruning index for each source table accessed from the storage platform 104 and use a pruning index to prune the set of micro-partitions of a source table to scan for data in executing a query. That is, given a query directed at a source table organized into a set of micro-partitions, the compute service manager 108 can access a pruning index from the database 114 and use the pruning index to identify a reduced set of micro-partitions to scan in executing the query. The set of micro-partitions to scan in executing a query may be referred to herein as a "scan set."

In some embodiments, the compute service manager 108 may determine that a job should be performed based on data from the database 114. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be reclustered based on one or more DML commands being performed, wherein one or more of the DML commands constitute the trigger event.

The compute service manager 108 is further coupled to the execution platform 110, which provides multiple computing resources that execute various data storage and data retrieval tasks. The execution platform 110 is coupled to the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (e.g., Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the database system 102 based on the changing data storage/retrieval needs as well as the changing needs of the users and systems. The support of dynamic changes allows the database system 102 to scale quickly in response to changing demands on the systems and components within the database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the database system 102. Thus, in the described embodiments, the database system 102 is dynamic and supports regular changes to meet the current data processing needs.

During typical operation, the database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
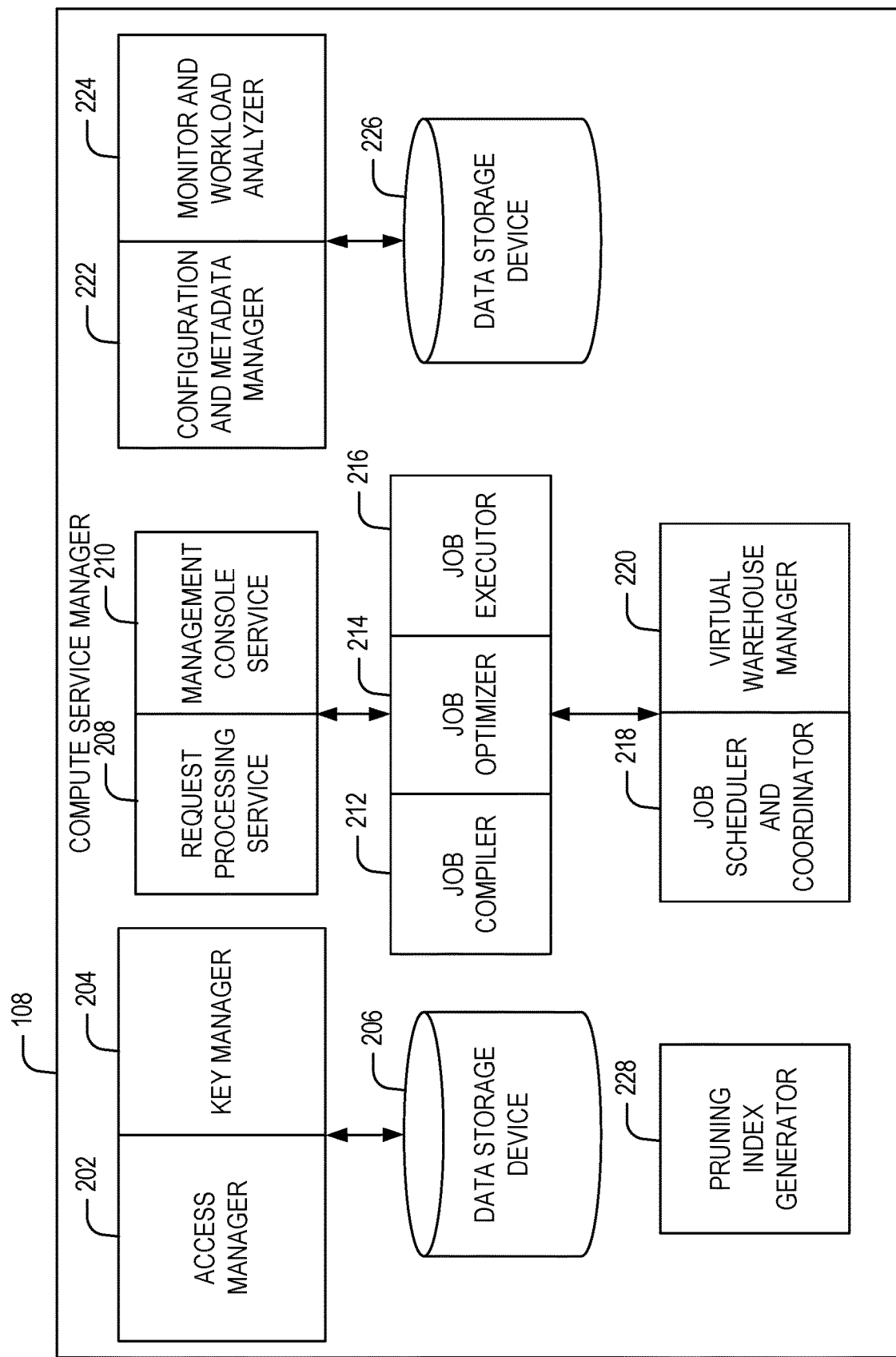
FIG. 2 is a block diagram illustrating components of a compute service manager, in accordance with some embodiments.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the database system 102. For example, data storage device 226 may represent caches in execution platform 110, storage devices in storage platform 104, or any other storage device.

As shown, the compute service manager 108 further includes a pruning index generator 228. The pruning index generator 228 is responsible for generating pruning indexes to be used in pruning scan sets for queries directed to tables stored in the storage platform 104. Each pruning index comprises a set of filters (e.g., blocked bloom filters, bloom filters, hash filter, or cuckoo filters) that encode an existence of unique values in each column of a source table. The pruning index generator 228 generates a filter for each micro-partition of a source table and each filter indicates whether data matching a query is potentially stored on a particular micro-partition of the source table. Further details regarding the generation of pruning indexes are discussed below.

Figure 3:
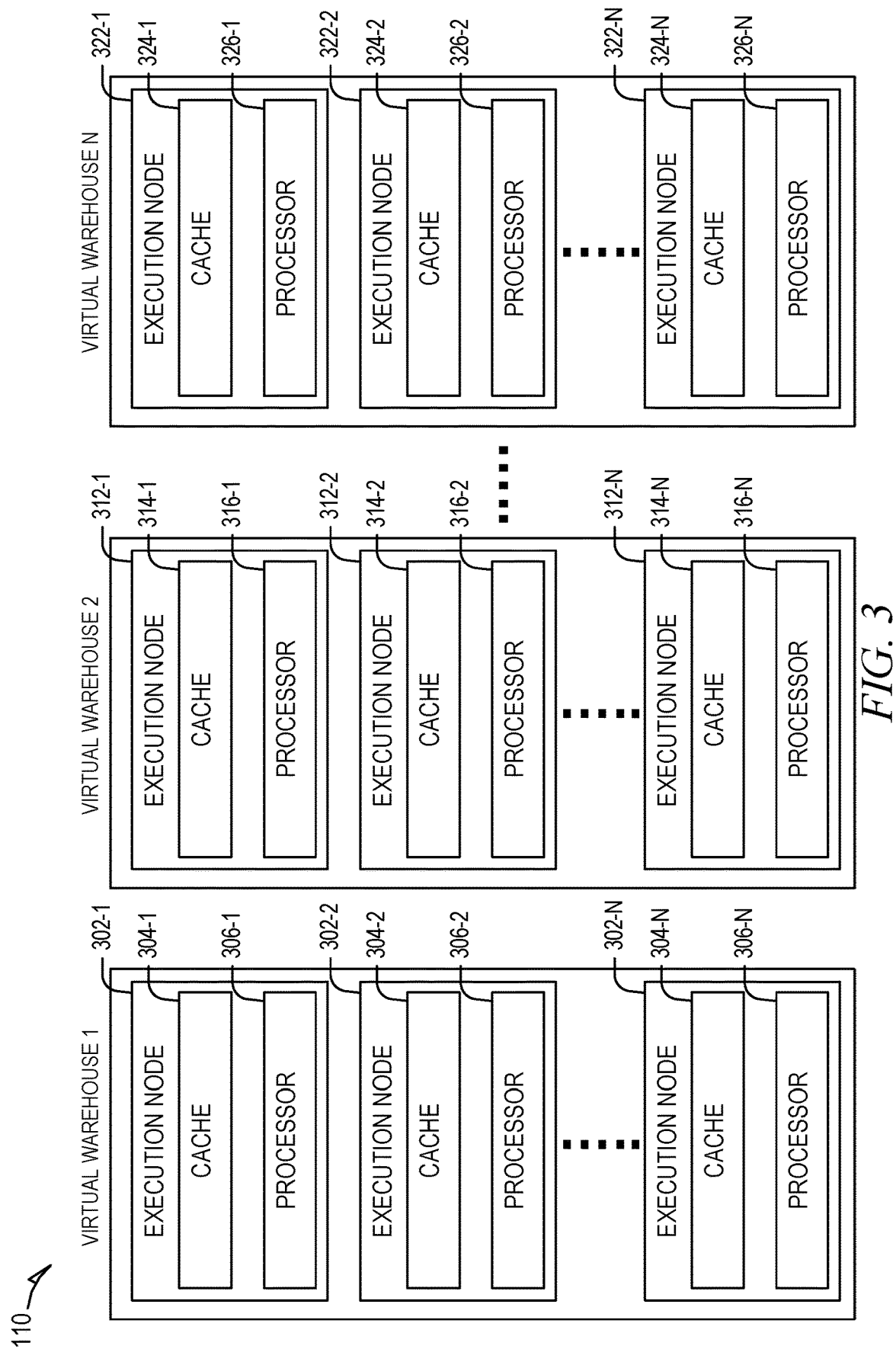
FIG. 3 is a block diagram illustrating components of an execution platform, in accordance with some embodiments.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
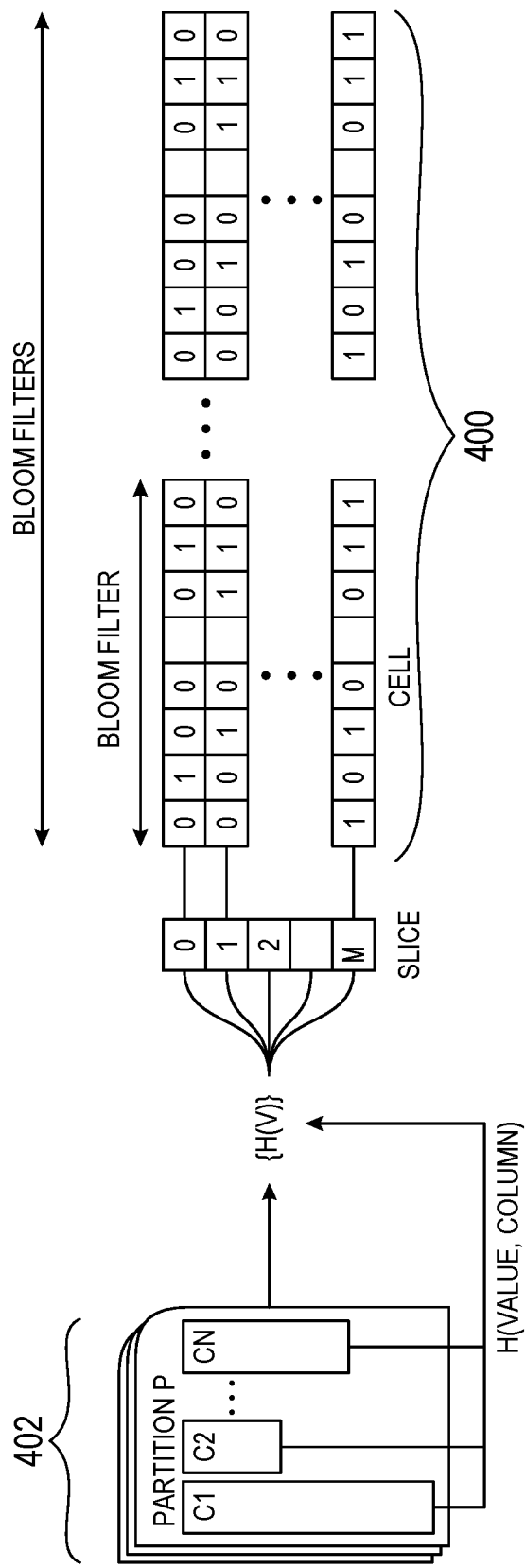
FIG. 4 is a conceptual diagram illustrating generation of an example blocked bloom filter, which may form part of a pruning index, in accordance with some example embodiments.

FIG. 4 is a conceptual diagram illustrating generation of a filter 400, which forms part of a pruning index generated by the database system 102 based on a source table 402, in accordance with some example embodiments. As shown, the source table 402 is organized into multiple micro-partitions and each micro-partition comprises multiple columns in which values are stored.

In generating a pruning index, the compute service manager 108 generates a filter for each micro-partition of the source table 402, an example of which is illustrated in FIG. 4 as blocked bloom filter 400. Blocked bloom filter 400 comprises multiple bloom filters and encodes the existence of distinct values present in each column of the corresponding micro-partition. When a query is received, rather than scanning the entire source table 402 to evaluate the query, the database system 102 probes the pruning index to identify a reduced scan set of micro-partitions comprising only a subset of the micro-partitions of the source table 402.

As shown, the blocked bloom filter 400 is decomposed into N bloom filters stored as individual columns of the pruning index to leverage columnar scans. In generating the blocked bloom filter 400 for a particular micro-partition of the source table 402, values of stored values or preprocessed variants thereof are transformed into bit positions in the bloom filters. For example, a set of fingerprints (e.g., hash values) can be generated from stored values (or N-grams generated from stored values) in each column of the micro-partition and the set of fingerprints may be used to set bits in the bloom filters. Each line of the blocked bloom filter 400 is encoded and stored as a single row in the pruning index. Each bloom filter 400 is represented in the pruning index as a two-dimensional array indexed by the fingerprints for the stored column values.

FIG. 5 illustrates a portion of an example pruning index 500, in accordance with some embodiments of the present disclosure. The example pruning index 500 is organized into a plurality of rows and columns. The columns of the pruning index 500 comprise a partition number 502 to store a partition identifier and a blocked bloom filter 504 (e.g., the blocked bloom filter 400) that is decomposed into multiple numeric columns; each column in the blocked bloom filter 504 represents a bloom filter. To avoid obscuring the inventive subject matter with unnecessary detail, various additional columns that are not germane to conveying an understanding of the inventive subject matter may have been omitted from the example pruning index 500 in FIG. 5.

Figure 6:
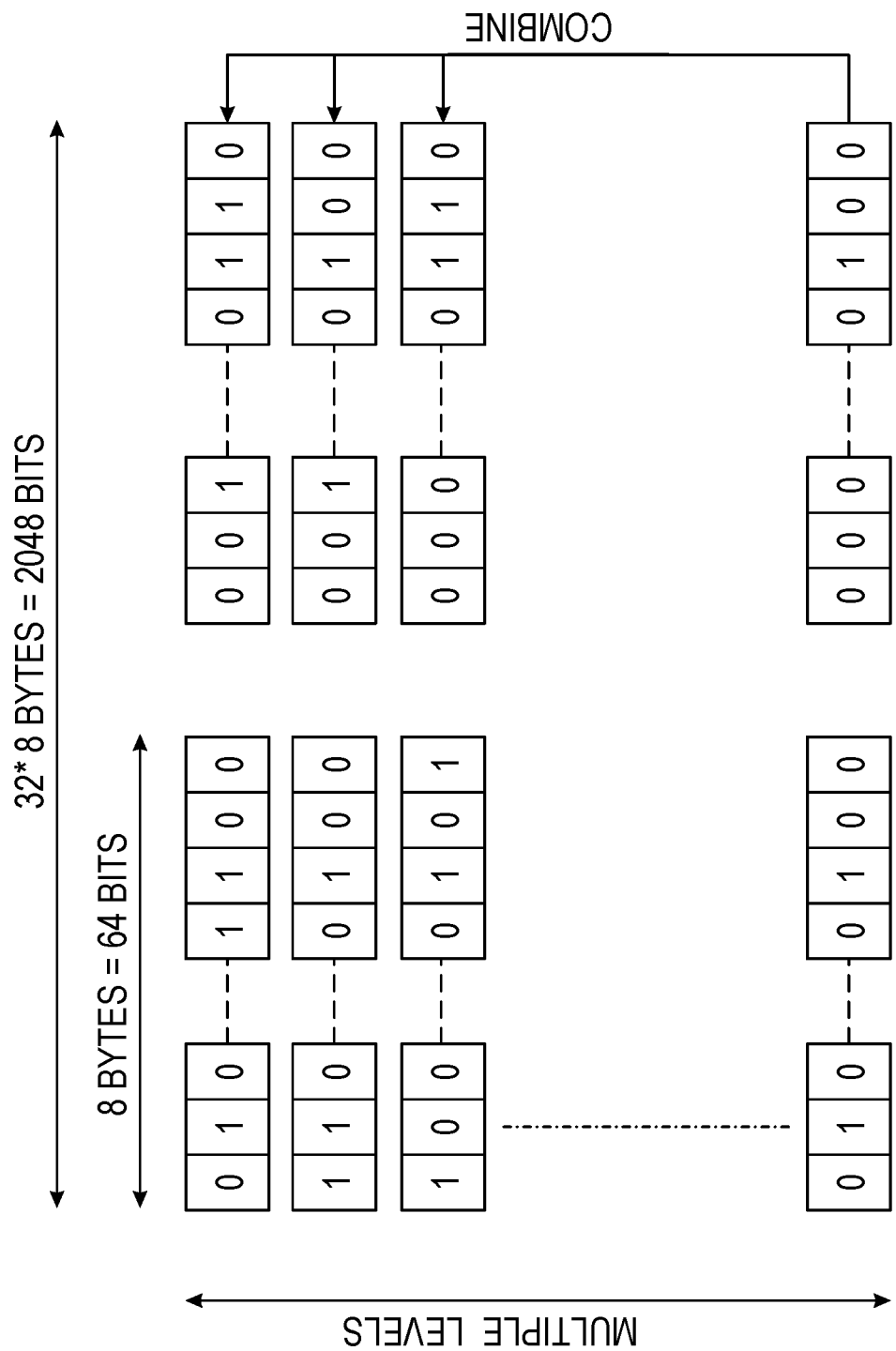
FIG. 6 is a conceptual diagram illustrating further details regarding the creation of an example pruning index, in accordance with some embodiments.

FIG. 6 is a conceptual diagram illustrating creation of an example pruning index, in accordance with some embodiments. The creation of a filter (e.g., a blocked bloom filter) is performed by a specialized operator within the compute service manager 108 that computes the set of rows of the pruning index. This operator obtains all the columns of a particular micro-partition of a source table and populates the filter for that micro-partition.

If the total number of distinct values (or distinct N-grams of stored values) in the source table is unknown, the compute service manager 108 allocates a maximum number of levels to the pruning index, populates each filter, and then applies a consolidation phase to merge the different filters in a final representation of the pruning index. The memory allocated to compute this information per micro-partition is constant. In the example illustrated in FIG. 6, the memory allocated to compute this information is a two-dimensional array of unsigned integers. The first dimension is indexed by the level (maximum number of levels) and the second dimension is indexed by the number of bloom filters. Since each micro-partition is processed by a single thread, the total memory is bounded by the number of threads (e.g., 8) and the maximum level of levels.

As shown in FIG. 6, at each micro-partition boundary, the compute service manager 108 combines blocks based on a target bloom filter density. For example, the compute service manager 108 may combine blocks such that the bloom filter density is no more than half. Since the domain of fingerprints (e.g., hashed values) is uniform, this can be done incrementally or globally based on the observed number of distinct values computed above.

If the number of distinct values is known, the compute service manager 108 determines the number of levels for the pruning index by dividing the maximum number of distinct values (or distinct N-grams) by the number of distinct values (or distinct N-grams) per level. To combine two levels, the compute service manager 108 performs a logical OR on all the integers representing the filter.

For performance reasons, the filter functions (create and check) can combine two hash functions (e.g., two 32-bit hash functions). Both the hash function computation and the filter derivation need to be identical on both the execution platform 110 and compute service manager 108 to allow for pruning in compute service manager 108 and in the scan set initialization in the execution platform 110.

Figure 7:
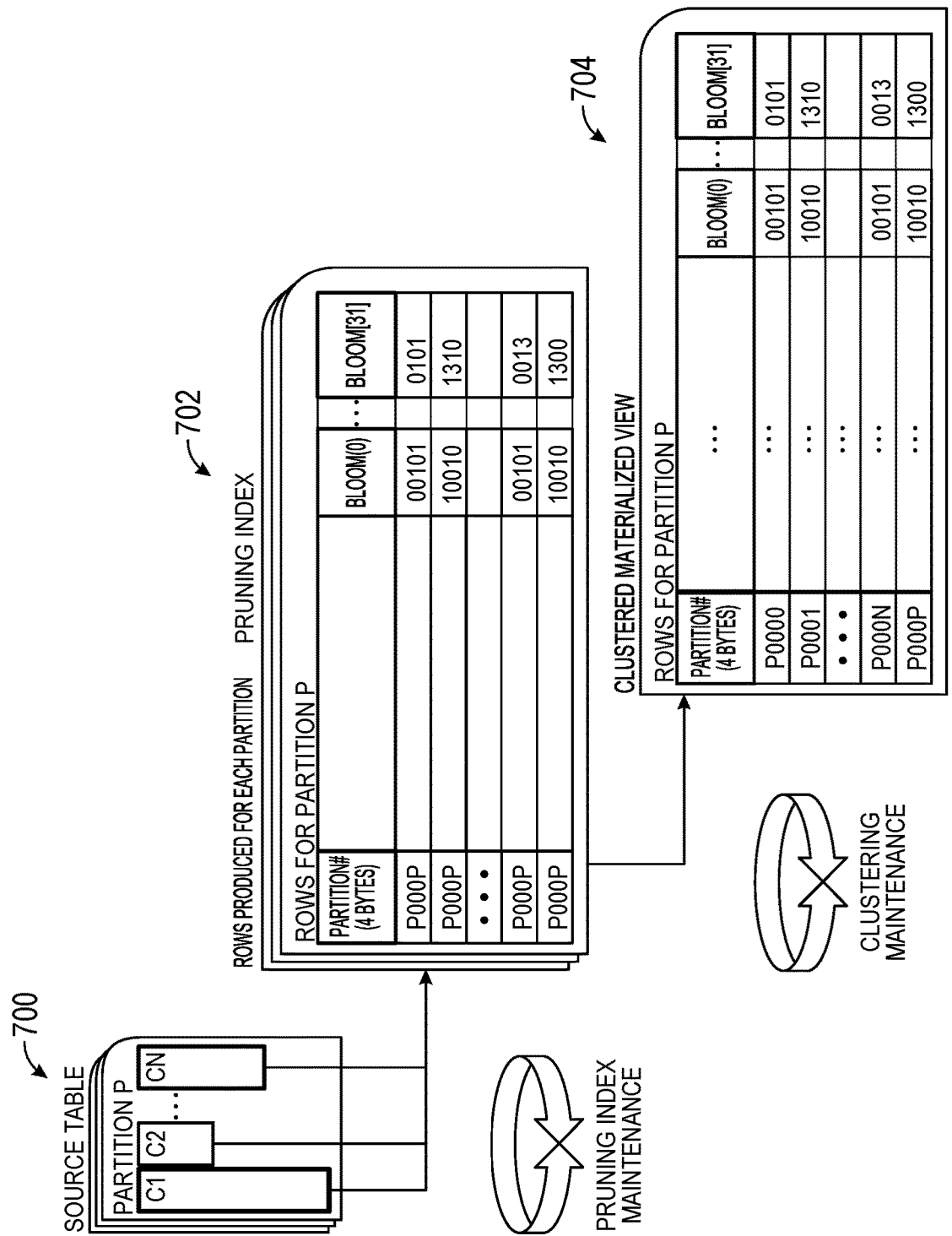
FIG. 7 is a conceptual diagram illustrating maintenance of a pruning index, in accordance with some embodiments.
Figure 8:
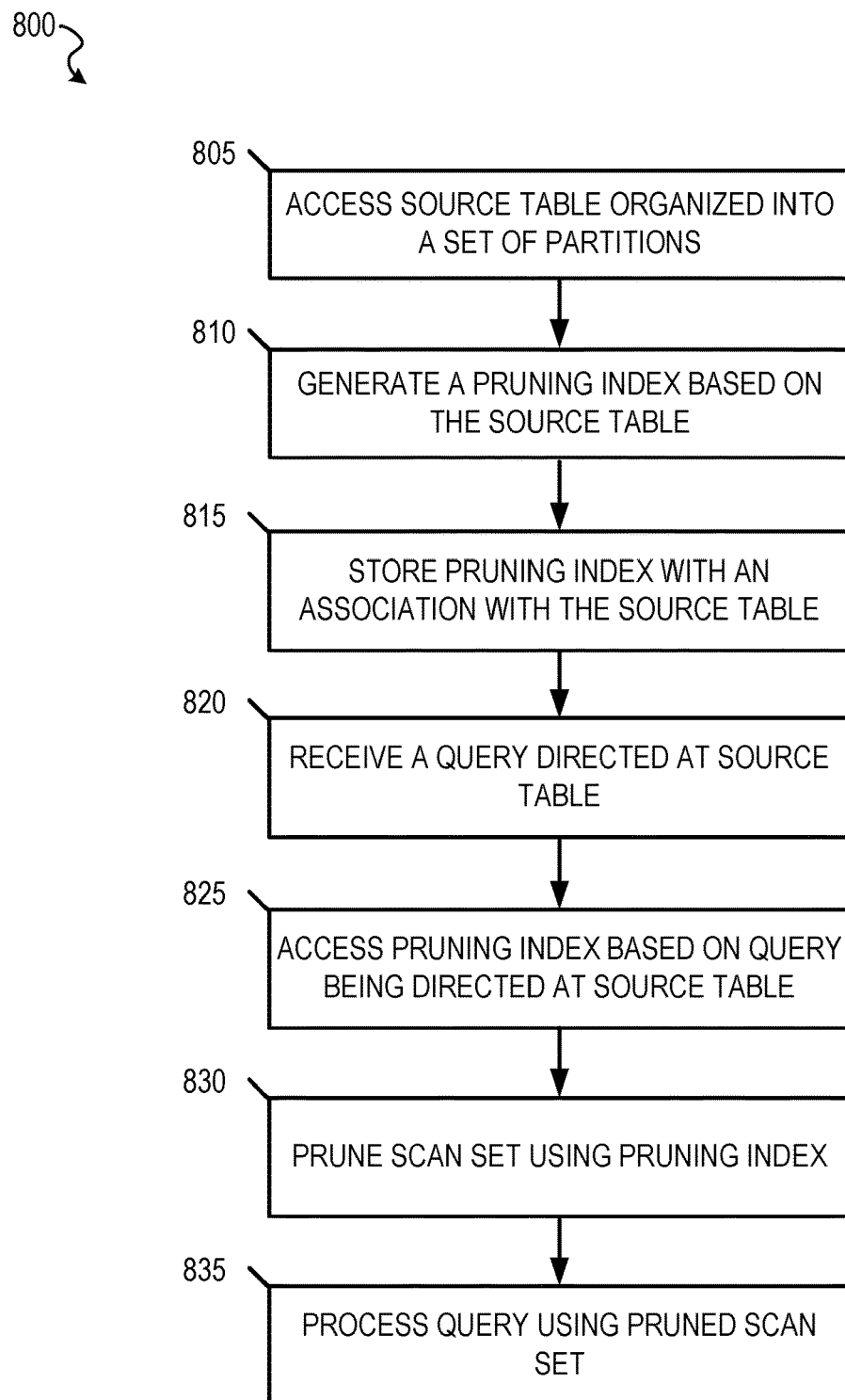
FIGS. 8-12 are flow diagrams illustrating operations of the network-based database system in performing a method for generating and using a pruning index in processing a database query, in accordance with some embodiments.

FIG. 7 is a conceptual diagram illustrating maintenance of a pruning index based on changes to a source table, in accordance with some embodiments. As shown, at 700, a change is made to a source table (e.g., addition of one or more rows or columns). The change to the source table triggers generation of additional rows in the pruning index for each changed or new micro-partition of the source table, at 702. At a regular interval, the newly produced rows in the pruning index are reclustered, at 704.

The compute service manager 108 uses a deterministic selection algorithm as part of clustering the prune index. The processing of each micro-partition in the source table creates a bounded (and mostly constant) number of rows based on the number of distinct values (or N-grams of stored values) in the source micro-partition. By construction, those rows are known to be unique and the index domain is non-overlapping for that partition and fully overlapping with already clustered index rows. To minimize the cost of clustering, the compute service manager 108 delays reclustering of rows until a threshold number of rows have been produced to create constant partitions.

Although the pruning index is described in some embodiments as being implemented specifically with blocked bloom filters, it shall be appreciated that the pruning index is not limited to blocked bloom filters, and in other embodiments, the pruning index may be implemented using other filters such as bloom filters, hash filters, or cuckoo filters.

FIGS. 8-12 are flow diagrams illustrating operations of the database system 102 in performing a method 800 for generating and using a pruning index in processing a database query, in accordance with some embodiments of the present disclosure. The method 800 may be embodied in computer-readable instructions for execution by one or more hardware components (e.g., one or more processors) such that the operations of the method 800 may be performed by components of database system 102. Accordingly, the method 800 is described below, by way of example with reference thereto. However, it shall be appreciated that the method 800 may be deployed on various other hardware configurations and is not intended to be limited to deployment within the database system 102.

Depending on the embodiment, an operation of the method 800 may be repeated in different ways or involve intervening operations not shown. Though the operations of the method 800 may be depicted and described in a certain order, the order in which the operations are performed may vary among embodiments, including performing certain operations in parallel or performing sets of operations in separate processes. For example, although the use and generation of the pruning index are described and illustrated together as part of the method 800, it shall be appreciated that the use and generation of the pruning index may be performed as separate processes, consistent with some embodiments.

At operation 805, the compute service manager 108 accesses a source table that is organized into a plurality of micro-partitions. The source table comprises a plurality of cells organized into rows and columns and a data value is included in each cell.

At operation 810, the compute service manager 108 generates a pruning index based on the source table. The pruning index comprises a set of filters (e.g., a set of blocked bloom filters) that index distinct values (or distinct N-grams of stored values) in each column of each micro-partition of the source table. A filter is generated for each micro-partition in the source table and each filter is decomposed into multiple numeric columns (e.g., 32 numeric columns) to enable integer comparisons. Consistent with some embodiments, the pruning index comprises a plurality of rows and each row comprises at least a micro-partition identifier and a set of bloom filters. Consistent with some embodiments, the compute service manager 108 generates the pruning index in an offline process before receiving a query.

At operation 815, the compute service manager 108 stores the pruning index in a database with an association with the source table such that the pruning index can be retrieved upon receiving a query directed at the source table.

At operation 820, the compute service manager 108 receives a query directed at the source table. The query can comprise an equality predicate (e.g., "="), a pattern matching predicate (e.g., LIKE, ILIKE, CONTAINS, STARTSWITH, or ENDSWITH), or an in-list predicate (e.g., 'column IN (value1, value2)' is equal to 'column=value1 OR column=value2'). In instances in which the query includes a pattern matching predicate, the query specifies a search pattern for which matching stored data in the source table is to be identified. A query predicate can be directed to primitive data types (e.g., STRING, NUMBER, or the like), complex data types (e.g., ARRAY or OBJECT), semi-structured data types (e.g., JSON, XML, Parquet, and ORC), or combinations thereof. In some instances, values for one or more query predicates may be unknown prior to runtime. For example, the query can include a join clause or a subquery.

At operation 825, the compute service manager 108 accesses the pruning index associated with the source table based on the query being directed at the source table. For example, the database 114 may store information describing associations between tables and pruning indexes.

At operation 830, the compute service manager 108 uses the pruning index to prune the set of micro-partitions of the source table to be scanned for data that satisfies the query (e.g., a data value that satisfies a query predicate or data that matches the search pattern). That is, the compute service manager 108 uses the pruning index to identify a reduced scan set comprising only a subset of the micro-partitions of the source table. The reduced scan set includes one or more micro-partitions in which data that satisfies the query is potentially stored. The subset of micro-partitions of the source table include micro-partitions determined to potentially include data that satisfies the query based on the set of bloom filters in the pruning index.

At operation 835, the execution platform 110 processes the query. In processing the query, the execution platform 110 scans the subset of micro-partitions of the reduced scan set while foregoing a scan of the remaining micro-partitions. In this way, the execution platform 110 searches only micro-partitions where matching data is potentially stored while foregoing an expenditure of additional time and resources to also search the remaining micro-partitions for which it is known, based on the pruning index, that matching data is not stored.

Consistent with some embodiments, rather than providing a reduced scan set with micro-partitions of the source table to scan for data, the compute service manager 108 may instead identify and compile a set of non-matching micro-partitions. The compute service manager 108 or the execution platform 110 may remove micro-partitions from the scan set based on the set of non-matching micro-partitions.

The processing of the query can include executing a query plan compiled by the compute service manager 108. In some embodiments (e.g., where values for query predicates are known prior to query runtime), the query plan may indicate the reduced scan set to scan. In some embodiments, values for one or more query predicates are unknown prior to query runtime, and only upon determining these values at runtime can the pruning index be used to prune the scan set. Consistent with these embodiments, the pruning of the scan set (operation 830) can also be performed at runtime as part of executing the query plan compiled by the compute service manager 108. Further details regarding processing of queries where values for one or more query predicates are unknown prior to runtime are discussed below.

Figure 9:
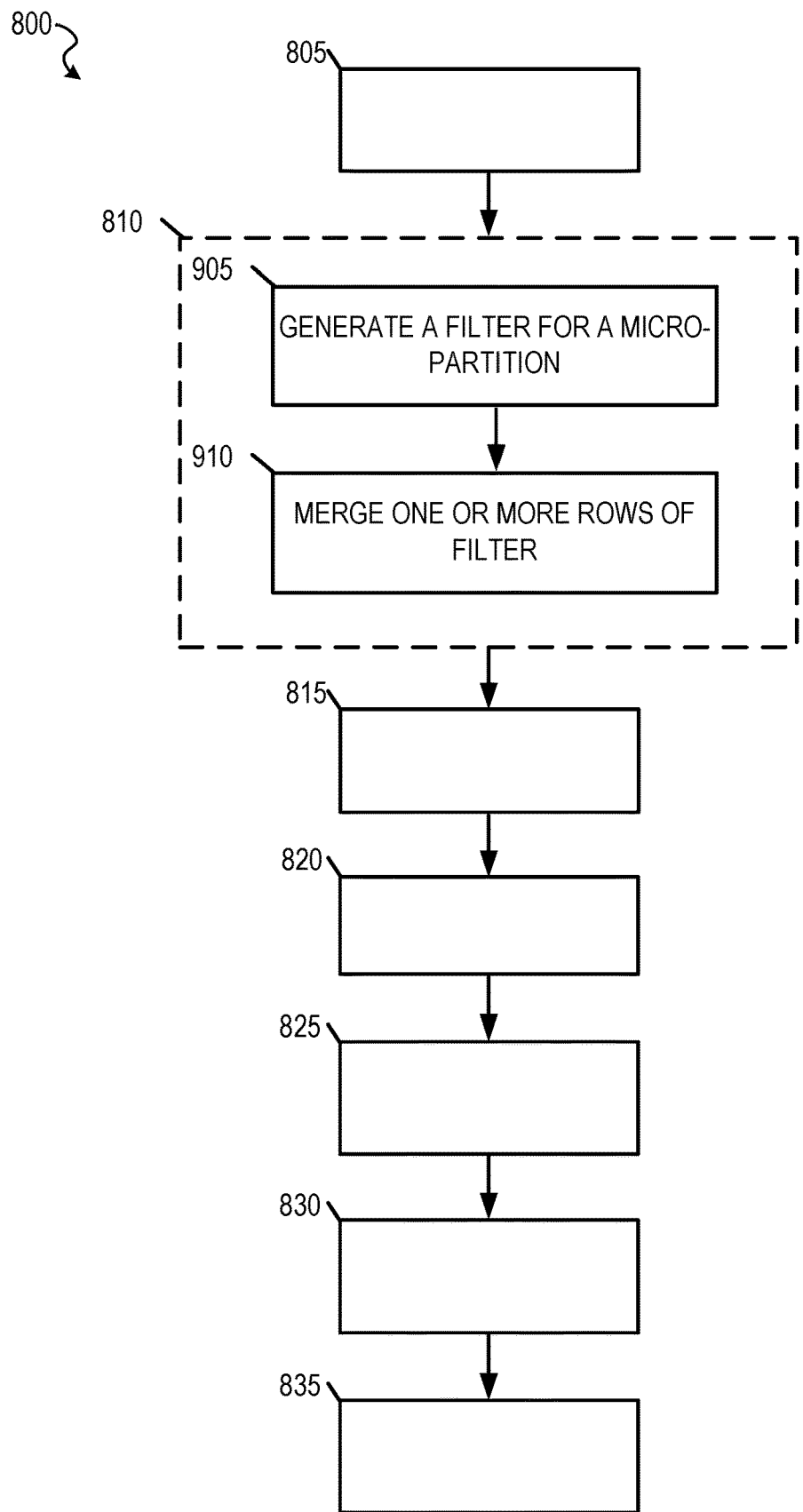

As shown in FIG. 9, the method 800 may, in some embodiments, further include operations 905 and 910. Consistent with these embodiments, the operations 905 and 910 may be performed as part of the operation 810 where the compute service manager 108 generates the pruning index. The operations 905 and 910 are described below in reference to a single micro-partition of the source table simply for ease of explanation. However, it shall be appreciated that in generating the pruning index, the compute service manager 108 generates a filter for each micro-partition of the source table, and thus the operations 905 and 910 may be performed for each micro-partition of the source table.

At operation 905, the compute service manager 108 generates a filter for a micro-partition of the source table. For example, the compute service manager 108 may generate a blocked bloom filter for the micro-partition that indexes distinct values (or distinct N-grams of values) in each column of the micro-partition of the source table. The generating of the filter can include generating a set of fingerprints for each searchable data value in the micro-partition.

Given that objects in semi-structured data type columns can be stored as potentially multiple different data types by the network-based database system 102 (referred to herein as "stored data types"), the compute service manager 108 can, in some embodiments, generate fingerprints for a given object in a semi-structured column of the source table based on one or more data type transformations generated for the object, as will be discussed in further detail below. A data type transformation can be generated by converting a data object into a stored data type, for example, using an SQL Cast Function (also referred to simply as a "cast"). By generating fingerprints in this matter, the compute service manager 108 can support indexing of semi-structured data type objects included in the source table.

In some embodiments, for a given data value in the micro-partition, the compute service manager 108 can generate the set of fingerprints based on a set of N-grams generated for the data value. The set of N-grams can be generated based on the data value or one or more preprocessed variants of the data value. The compute service manager 108 can generate a fingerprint based on a hash that is computed of an N-gram.

In computing the hash, the compute service manager 108 may utilize a rolling hash function or other known hashing scheme that allows individual characters to be added or removed from a window of characters. An example hash function used by the compute service manager 108 is the XxHash( ) function, although other known hash functions can be utilized. Each generated fingerprint is used to populate a cell in the filter.

At operation 910, which is optional in some embodiments, the compute service manager 108 merges one or more rows of the filter. The compute service manager 108 can merge rows by performing a logical OR operation. The compute service manager 108 may merge rows of the filter until a density threshold is reached, where the density refers to the ratio of 1's and 0's in a row. The density threshold may be based on a target false positive rate.

In some instances, values for one or more predicates for the query (received at operation 820) may be unknown until runtime (e.g., until execution of the query). For example, the query may include a join clause to combine rows from two or more tables. The following is an example of a typical join query:

SELECT . . .
FROM fact
JOIN dimension ON (fact.dimension_id_foreign_key= dimension.id)
WHERE dimension.column1='xyz';

Because of the additional "dimension.column1='xyz'" predicate, not all values of the "dimension.id" domain are present in the set of tuples that form the build side table of this join. Only tuples of the fact table whose "fact.dimension_id_foreign_key" column equals one of these values have to be scanned to answer the query at hand.

Another example of queries in which the values for predicates become available only at runtime are subqueries, an example of which is as follows:

SELECT table.column2
FROM table
WHERE table.column1=(SELECT AVG(column3) FROM table2);

Here, the value that "table.column1" has to be equal to is only known at runtime, after the subquery has been executed.

Figure 10:
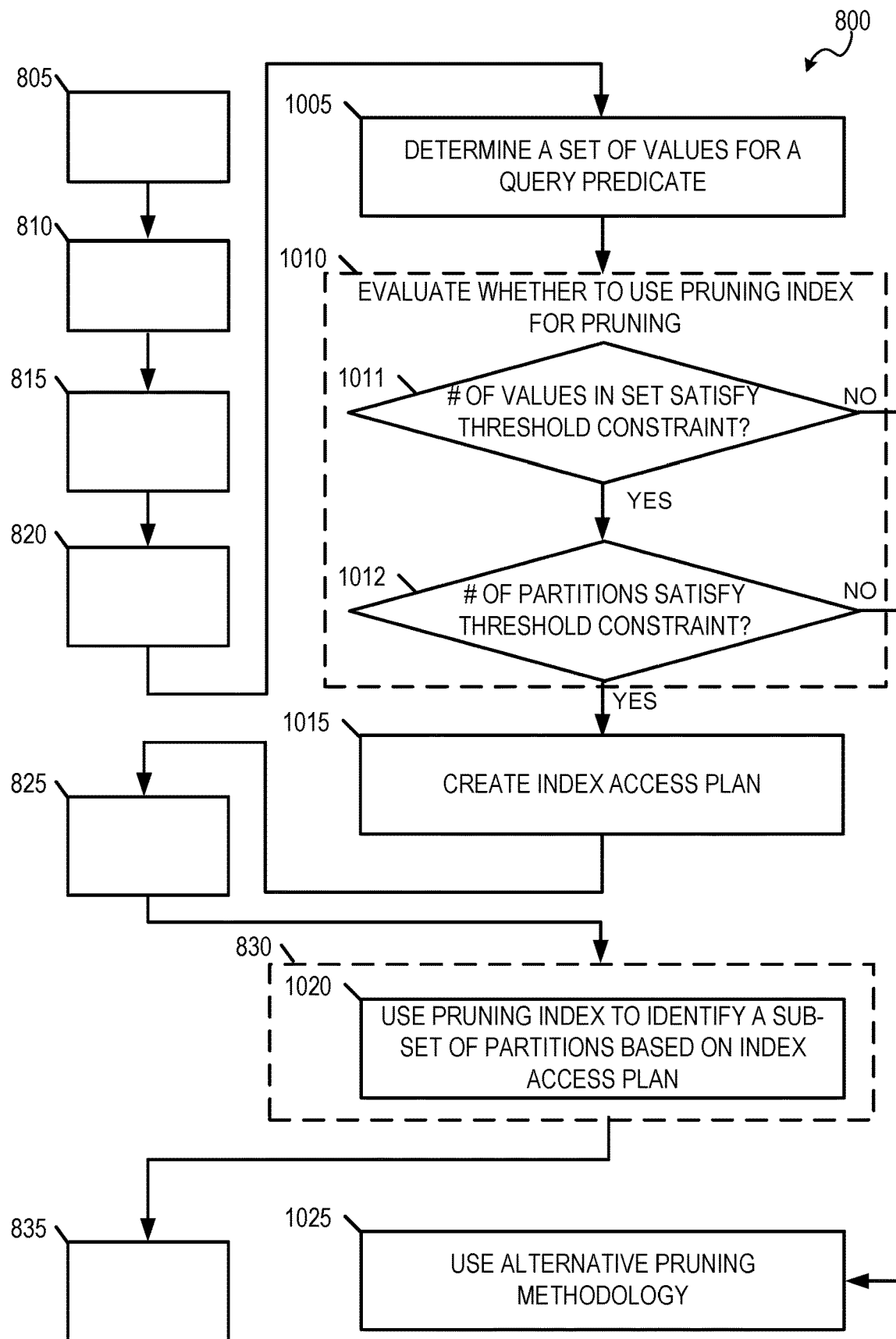

To handle such queries, the method 800 can, in some embodiments, include operations 1005, 1010, 1011, 1012, 1015, 1020, and 1025 as shown in FIG. 10. With reference to FIG. 10, the operations 1005, 1010, 1011, 1012, and 1015 can be performed subsequent to operation 820 where the compute service manager 108 receives a query in which values for one or more predicates are unknown until runtime (e.g., a query with a join statement or subqueries). Consistent with these embodiments, any one or more of the operations 1005, 1010, 1011, 1012, and 1015 can be performed subsequent to compilation of the query. For example, any one or more of the operations 1005, 1010, 1011, 1012, and 1015 can be performed at runtime. In addition, any one of the operations 825, 830, and 835 can be performed at runtime, consistent with these embodiments.

At operation 1005, the execution platform 110 determines a set of values for a query predicate that were unknown prior to runtime. In an example, the query includes a join clause to combine rows for at least two tables, and the execution platform 110 collects a set of values for the query predicate in performing a join build phase in which the compute service manager 108 builds a hash table where rows from a first table (the build side table) are stored using the join attribute(s) as the hash key. In general, join predicates can be converted into either an equality predicate or an in-list predicate, depending on how many values are in the build side. In another example, the query includes a subquery, which is to be executed before the values to match against are known. In this example, determining the set of values includes executing a subquery.

At operation 1010, the execution platform 110 evaluates whether to use the pruning index to prune the scan set. In doing so, the execution platform 110 uses a cost function to evaluate the use of the pruning index. If the cost associated with using the pruning index is too high (e.g., the cost exceeds a predetermined cost threshold), the execution platform 110 does not use the pruning index. Otherwise, the execution platform 110 prunes the scan set with the pruning index.

As shown, in some embodiments, the evaluation performed at operation 1010 can include operations 1011 and 1012. At operation 1011, the execution platform 110 determines whether the number of values in the set of values satisfies a threshold constraint. In determining whether the number of values satisfies the threshold constraint, the execution platform 110 may compare the number of values in the set of values to a threshold number, and if the number of values in the set does not exceed the threshold number, the execution platform 110 determines the number of values in the set satisfies the threshold constraint. Otherwise, the threshold constraint is not satisfied. If the threshold constraint is not satisfied, the method 800 moves to operation 1025 where an alternative pruning mechanism is used to prune the scan set rather than the pruning index. For example, the execution platform 110 can perform conventional join pruning techniques.

If the number of values in the set of values satisfies the threshold constraint, the method 800 advances to operation 1012 where the execution platform 110 determines whether the number of micro-partitions in the table (to which the query is directed) satisfies a threshold constraint. In determining whether the number of micro-partitions satisfies the threshold constraint, the execution platform 110 may compare the number of micro-partitions in the table to a threshold number of micro-partitions, and if the number of micro-partitions does not exceed the threshold number, the execution platform 110 determines the number of micro-partitions in the set satisfies the threshold constraint. Otherwise, the threshold constraint is not satisfied. If the threshold constraint is not satisfied, the method 800 moves to operation 1025 where an alternative pruning mechanism is used to prune the scan set rather than the pruning index.

If the execution platform 110 decides to use the pruning index based on the evaluation using the cost function (e.g., if the number of values in the set of values satisfies the threshold constraint and/or if the number of micro-partitions in the table satisfies the threshold constraint), the execution platform 110 generates an index access plan based on the set of values, at operation 1015. The index access plan specifies the set of values to compare against the pruning index to determine the reduced scan set. In some embodiments, the execution platform 110 may, as part of generating the access plan, generate a data structure based on the set of values. As non-limiting example, the data structure can be a list of the values.

Based on the index access plan, the execution platform 110 accesses the pruning index associated with the source table (operation 825) and uses the pruning index to prune the scan set at runtime (operation 830). As shown in FIG. 10, in some embodiments, the operation 1020 can be performed as part of the operation 830 where the execution platform 110 prunes the scan set using the pruning index. At operation 1020, the execution platform 110 uses the pruning index to identify a subset of micro-partitions of the table to scan based on the index access plan. For example, the execution platform 110 may generate one or more fingerprints for each value in the set of values (e.g., by computing a hash over the values) and compare the computed fingerprints to the pruning index to identify a reduced scan set comprising only a subset of the micro-partitions of the table in which data that satisfies the query is potentially stored. That is, the execution platform 110 identifies one or more values (e.g., fingerprints) in the pruning index that match at least one fingerprint in the set of fingerprints. The subset of micro-partitions of the source table include micro-partitions determined to potentially include data that satisfies the query.

In the example in which the query includes a join clause, the processing of the query includes performing a join probe phase in which execution nodes of the execution platform 110 read rows from a second table (the probe side table) and probe the hash table for a matching row using a join attribute as the lookup key. For each match that is identified, a joined row is returned. In this example, the probe side table corresponds to the pruning index accessed at operation 825. In performing the join probe phase, only the reduced scan set from the probe side table is used to probe the hash table. That is, only rows from micro-partitions in the reduced scan set are used to probe the hash table to identify matching rows.

In some instances, a table can include one or more columns of data of a semi-structured data type used to store objects of any kind, such as primitive data types like numbers, strings, binary data, date, time, and timestamp values, as well as compound data types such as objects and arrays that store a nested structure inside. Accordingly, it is important that pruning indexes generated by the database system 102 also support query predicates on semi-structured data types in addition to predicates on primitive data-type fields. As non-limiting examples, a pruning index can be generated to support the following types of predicates:

. . . where <path to_semi-structured_data_type_field>=<constant>;
. . . where <pathto_semi-structured_data_type_field>::<cast_to_type>=<constant>
. . . where ≤semi-structured_data_type_column>= <constant>;
. . . where <path to semi-structured_data type_field> like '%pattern%';
. . . where ≤semi-structured_data_type_column> like '%pattern%';
ARRAY predicates: array_contains(<value>); arrays_overlap(<array1>, <array2>)

Extending the pruning index to support such semi-structured predicate types can present a number of challenges. For example, semi-structured data type schemas such as JSON schemas can be highly nested (e.g., a field can contain an ARRAY object, which in turn holds values of heterogeneous types, including other complex types such as OBJECT or ARRAY). As another example, semi-structured data can evolve in time (e.g., new fields can be added or existing fields can be removed). As another example, the data type for the same field in one row can be different from the one in another row (e.g., an ID field can be represented as a NUMBER and STRING in different rows). As yet another example of the challenges posed by semi-structured data types, a single value might correspond to multiple data types (e.g., a STRING value can contain a valid DATE, TIME, TIMESTAMP, NUMBER, etc. data types). In still another example, the same value might match against several semi-structured data types due to the presence of a cast function (e.g., a TIMESTAMP value can be stored inside semi-structured data object of any TIMESTAMP version, as a NUMBER, as a STRING of TIMESTAMP, as a STRING of INTEGER).

Figure 11:
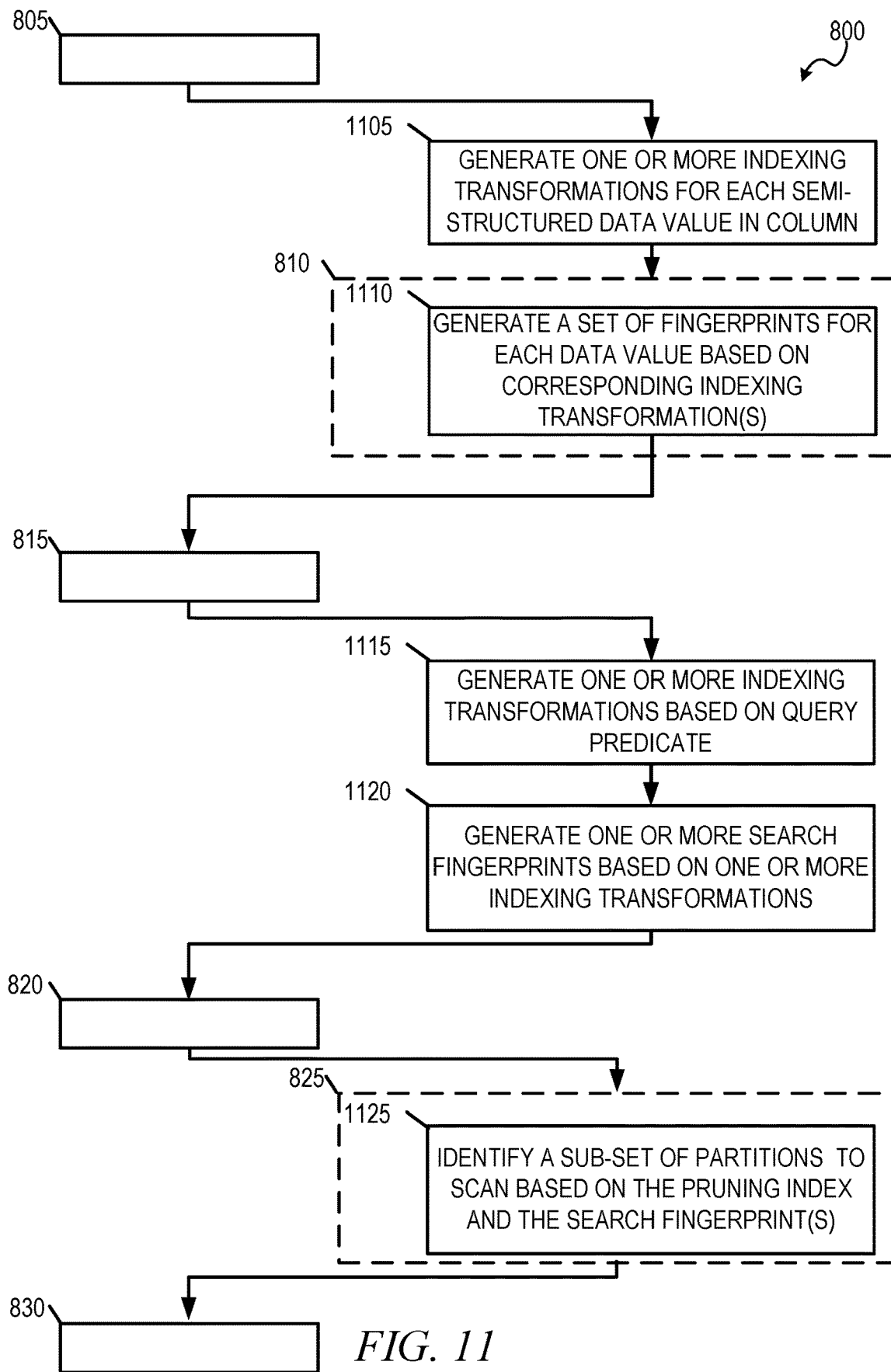

To extend the pruning index to support predicates on semi-structured data fields while addressing the foregoing challenges, operations 1105, 1110, 1115, 1120, and 1125 can be performed as part of the method 800, as shown in FIG. 11. Consistent with these embodiments, the operation 1105 may be performed prior to operation 810 where the compute service manager 108 generates the pruning index for the source table.

At operation 1105, the compute service manager 108 generates one or more indexing transformations for each object in a semi-structured data type column of the source table. The compute service manager 108 can generate an indexing transformation for a given object using a SQL cast function. Invocation of a cast function on an object is also referred to herein as "casting". The compute service manager 108 uses the cast function to convert the object to a stored data type. That is, the compute service manager 108 can cast the object from an input object type to a stored data type to generate an indexing transformation. In some instances, the compute service manager 108 generates an indexing transformation by casting the object to from a first logical data type (e.g., FIXED) to a second logical data type (e.g., REAL). In some instances, the compute service manager 108 generates an indexing transformation by casting the object to the same logical data type with a different scale and/or precision (e.g., a FIXED→FIXED (PRECISION, SCALE) transformation).

In instances of ARRAY and OBJECT data types, the compute service manager 108 generates an indexing transformation based on a path (e.g., an SQL path) of the data. More specifically, the compute service manager 108 generates a token for the indexing transformation that indicates that a complex path (corresponding to an ARRAY or OBJECT data types) is not indexed specifically. In an example of the forgoing, input data includes:

{"id": 45, "name": "John Appleseed", "age": 45} and a received query predicate includes:

src:id=45

In this example, if the path (i.e., "/id/" or "/age/") is not used when indexing and matching, the same values will be treated in the same way and will result in the same hashes. This can be problematic in example instances in which there are sender-receiving IP addresses or the same numeric values in multiple fields. Even if the "id" was different than 45, a pruning index look-up would still identify "45" because it is present in the "age" field. To address the challenges illustrated by this example, a token is generated based on a full absolute path of the data, as mentioned above.

Table 1, presented below, lists example indexing transformations that can be generated for multiple input object data types.

TABLE 1

| Input object data type | Indexing transformation |
| --- | --- |
| FIXED | FIXED → REAL |
|  | FIXED → FIXED |
|  | (PRECISION, SCALE) |
|  | TEXT |
| REAL | REAL |
|  | REAL → FIXED |
|  | TEXT |
| TEXT | TEXT |
|  | TEXT → NUMBER |
|  | (PRECISION, SCALE) |
|  | DATE |
|  | TIME |
|  | TIMESTAMP |
| DATE | DATE |
|  | TEXT |
| TIME | TIME |
|  | TEXT |
| TIMESTAMP_NTZ | TIMESTAMP_NTZ |
| TIMESTAMP_LTZ | TEXT |
| TIMESTAMP_TZ |  |
| BOOLEAN | FIXED |
|  | TEXT |
| NULL_VALUE | NULL_VALUE |
| ARRAY | PATH |
| OBJECT | PATH |

With specific reference to FIXED and REAL data types, after parsing number input, values can be stored as fixed point (LogicalType::FIXED) or real (LogicalType::REAL) objects. As shown in Table 1, for FIXED input data types, the compute service manager 108 applies a FIXED to REAL transformation. The output value of REAL data type is stabilized and indexed. Additionally, a FIXED to FIXED (precision, scale) transformation is performed, in which the output FIXED data type has a different precision or scale (e.g., 0) than the input. Although this may reduce precision, this enables matching against NUMBER (?,?) casts. A FIXED to TEXT transformation is also performed to enable string matching. For REAL input object data types, the REAL value is stabilized and indexed if it is in the range of FIXED data type. In instances in which the value is out-of-range (e.g., 1e+50), the value may be discarded from indexing. A REAL to FIXED transformation is also performed and out-of-range REAL values are discarded. As with FIXED data types, a REAL to TEXT transformation is performed to enable exact string matching.

With reference to TEXT data types, textual data is indexed as text for exact string matching. Computed hash values for TEXT and BINARY data type values are the same, and thus no additional processing is required for BINARY objects. Other data types such as DATE, TIME, and TIMESTAMP can be stored as TEXT objects. Thus, in order to allow predicates on these data types, the compute service manager 108 may attempt casting textual data to each of these data types and keep successful conversions as indexing transformations.

Consistent with some embodiments, the network-based database system 102 can store DATA, TIME, and TIMESTAMP data types in TEXT objects. These object types can, however, be present in semi-structured data type columns of tables coming from external scans. When converting valid timestamp strings (and objects) into:

TIMESTAMP NTZ=> The output will not contain a timezone (or rather it is GMT-0). Even if the converted string has its own timezone, it is discarded.

TIMESTAMP_LTZ=> The output will have a local timezone attached. If the converted string does not have a timezone, the compute service manager 108 may add the local timezone. If the string already has a timezone, the compute service manager 108 may first apply the existing timezone, then attach to the local timezone.

TIMESTAMP_TZ=>There is a source local timezone but it is not used during computations. If the converted string does not have a timezone, the compute service manager 108 may add the local timezone. If the string already has a timezone, that timezone is used.

Assume STRING=DATE+[TIME]+[TZ] where current local timezone is LTZ. Then:

STRING→TIMESTAMP_NTZ=>DATE+[TIME]

STRING→TIMESTAMP_TZ=>DATE+[TIME]+
(TZ=@?LTZ: TZ)

STRING→TIMESTAMP_LTZ=>DATE+[TZ=0
?TIME: TIME+TZ−LTZ]+LTZ

TABLES 2 and 3 presented below provide examples of the foregoing formula.

TABLE 2

| STRING object without timezone information | |
| --- | --- |
| '2021-01-01 23:00:00' ::variant::timestamp_ntz; | Fri, 01 Jan 2021 23:00:00 +0000 |
| '2021-01-01 23:00:00' ::variant::timestamp_tz; | Fri, 01 Jan 2021 23:00:00 −0800 |
| '2021-01-01 23:00:00' ::variant::timestamp_ltz; | Fri, 01 Jan 2021 23:00:00 −0800 |

TABLE 3

| STRING object with timezone information | |
| --- | --- |
| '2021-01-01 23:00:00 −1200' variant::timestamp_ntz; | Fri, 01 Jan 2021 23:00:00 + 0000 |
| '2021-01-01 23:00:00 −1200' ::variant::timestamp_tz; | Fri, 01 Jan 2021 23:00:00 − 1200 |
| '2021-01-01 23:00:00 −1200' ::variant::timestamp_ltz; | Sat, 02 Jan 2021 03:00:00 − 0800 |

As noted by TABLE 1, indexing transformations for BOOLEAN data types correspond to FIXED and TEXT data types. For the BOOLEAN to FIXED transformation, the only possible values are '0' and '1'. For the BOOLEAN to TEXT transformation, the only possible values are "true" and "false." The BOOLEAN to FIXED indexing transformation can be especially useful for predicates of the following type:

Consistent with some embodiments, in performing the operation 1105, the compute service manager 108 may try to cast an object in a semi-structured data type column to one or more stored data types. That is, the compute service manager 108 attempts to convert the object to the stored data type using a SQL cast function. The object can be the first object in the column processed by the compute service manager 108.

If the cast fails, the compute service manager 108 stores an indicator to indicate that objects in the column cannot be cast to that particular data type. That is, an indicator is stored to indicate that the objects in the column are unable to be converted to the data type in response to a failed attempt to convert the object to the data type. In an example, the compute service manager 108 can insert a token in the pruning index that indicates that objects in the column cannot be cast to a particular data type. As the compute service manager 108 traverses additional objects in the column in generating a filter for the column in the pruning index, the stored token causes the compute service manager 108 to avoid further attempts at casting objects in the column to the data type for which the casting failed. If the cast is successful, the compute service manager 108 saves a result of the cast as an indexing transformation for the object and a fingerprint may subsequently be generated based on the indexing transformation, as described above. The compute service manager 108 casts the remaining objects in the column to the data types for which the cast is successful.

Although only a single data type is addressed above, it shall be appreciated that this process can be repeated for each supported data type. That is, the compute service manager 108 can try to cast the object in the column to each of multiple different supported data types. In this manner, the compute service manager 108 can learn which data types objects in the column can be cast to based on which data types the first object in the column can be cast to, and the compute service manager 108 can avoid attempting to cast the remaining objects in the column to data types that they cannot be cast to.

With returned reference to FIG. 11, the operation 1110 can be performed as part of the operation 810 where the compute service manager 108 generates the pruning index. At operation 1110, the compute service manager 108 generates a set of fingerprints for each data object in the column based on the corresponding indexing transformation(s) generated for the data object. That is, the compute service manager 108 generates a set of fingerprints for a given object based on the one or more indexing transformations generated for the object. As noted above in reference to operation 905, the set of fingerprints generated for each object in the column are used to generate a filter in the pruning index that corresponds to the column.

The compute service manager 108 can, in some instances, generate a fingerprint for a given object by computing a hash over an indexing transformation of the object or over the object itself. In other words, the set of fingerprints generated for a given object can include one or more fingerprints generated by computing a hash over an indexing transformation and a fingerprint generated by computing a hash over the object itself.

As discussed above, for complex data types such as ARRAY and OBJECT, the indexing transformation corresponds to a token that indicates the path (corresponding to an ARRAY or OBJECT data types) is not specifically indexed. In generating a fingerprint for such complex data types, the compute service manager 108 may compute a first hash over the path, and compute a second hash over the first hash to produce the fingerprint for the data. In some example embodiments, the hash function xxHash( ) is used to compute the hashes, though it shall be appreciated that any one of many known hashing techniques and functions can be used. In a first example, the compute service manager 108 can generate a fingerprint for a complex data type as follows:
XxHash(<constant>, <seed>=<hash_of_the_path>)
In a second example, the compute service manager 108 can generate a fingerprint for a complex data type as follows:
XxHash(XxHash(<constant>, <hash_of_the_path>), PRIME_1)

In a third example, the compute service manager 108 can generate a fingerprint for a complex data type as follows:
XxHash(XxHashCombine(<constant>,
    <seed>=PRIME_1,
    <intermediate>=<hash_of_the_path>), PRIME_1)

As shown, the operations 1115 and 1120 can, in some embodiments, be performed subsequent to the operation 815 where the query directed to the source table is received. Consistent with these embodiments, the query can include a predicate on a semi-structured data type column. At operation 1115, the compute service manager 108 generates one or more indexing transformations based on the query predicate. Similar to the indexing transformations generated for the objects in the semi-structured column, the compute service manager 108 can generate an indexing transformation for the query predicate by executing a cast function over one or more values in the predicate. That is, the compute service manager 108 can use the cast function to convert a value in the query predicate from a first data type to a second data type or to the same data type, but with a different precision and/or scale. In some instances, the value itself can be used as an indexing transformation without casting the value to a different data type.

For predicates such as IS_NOT_NULL(<semi-structured_data_type_field>) the argument semi-structured data field can correspond to both internal and leaf nodes, meaning that there is no information about the existence of the path. Thus, the compute service manager 108 cannot simply infer whether this path in fact contains a primitive value or represents an OBJECT or ARRAY data type. Therefore, the compute service manager 108 creates an IN predicate as follows:
  (<semi-structured_data_type_field> indexed as LEAF node)
Or
  (<semi-structured_data_type_field> indexed as INTERNAL node)
Accordingly, the compute service manager 108 generates two constants one for the leaf path and one for the internal path hash. These final constants can be fed into the IN predicate.

To address IN predicates in the following form: <semi-structured_data_type_field> in (C1, C2, . . . , Cn), the semi-structured data type field can be interpreted without any Cast( ) functions when the constants C1, C2, . . . Cn are numbers. Otherwise, the compute service manager 108 can unwrap the Cast for each constant separately. If the constant to match against is a STRING data type, two constants are created.

At operation 1120, the compute service manager 108 generates a set of search fingerprints based on the one or more indexing transformations. As with the fingerprints generated for the searchable values in the semi-structured column, the compute service manager 108 generates a fingerprint for the query predicate by computing a hash over an indexing transformation generated for the query predicate.

As shown, the operation 1125 can be performed as part of the operation 825 where the compute service manager 108 prunes the scan set. At operation 1125, the compute service manager 108 identifies a subset of micro-partitions to scan based on the pruning index and the search fingerprints. The compute service manager 108 can identify the subset by comparing the set of search fingerprints to values included in the pruning index (e.g., fingerprints of indexing transformations of stored data values in the source table), and identifying one or more values in the pruning index that match one or more search fingerprints. Specifically, the compute service manager 108 identifies one or more micro-partitions that potentially store data that satisfies the query based on fingerprints in the pruning index that match search fingerprint(s). That is, a fingerprint (e.g., hash value computed based on a indexing transformations of semi-structured data value) in the pruning index that matches a search fingerprint generated from a indexing transformation of the query predicate (e.g., a hash value computed based on the indexing transformation) indicates that matching data is potentially stored in a corresponding column of the micro-partition because the indexing transformation generated from the query predicate is stored in the column of the micro-partition. The corresponding micro-partition can be identified by the compute service manager 108 based on the matching fingerprint in the pruning index.

Figure 12:
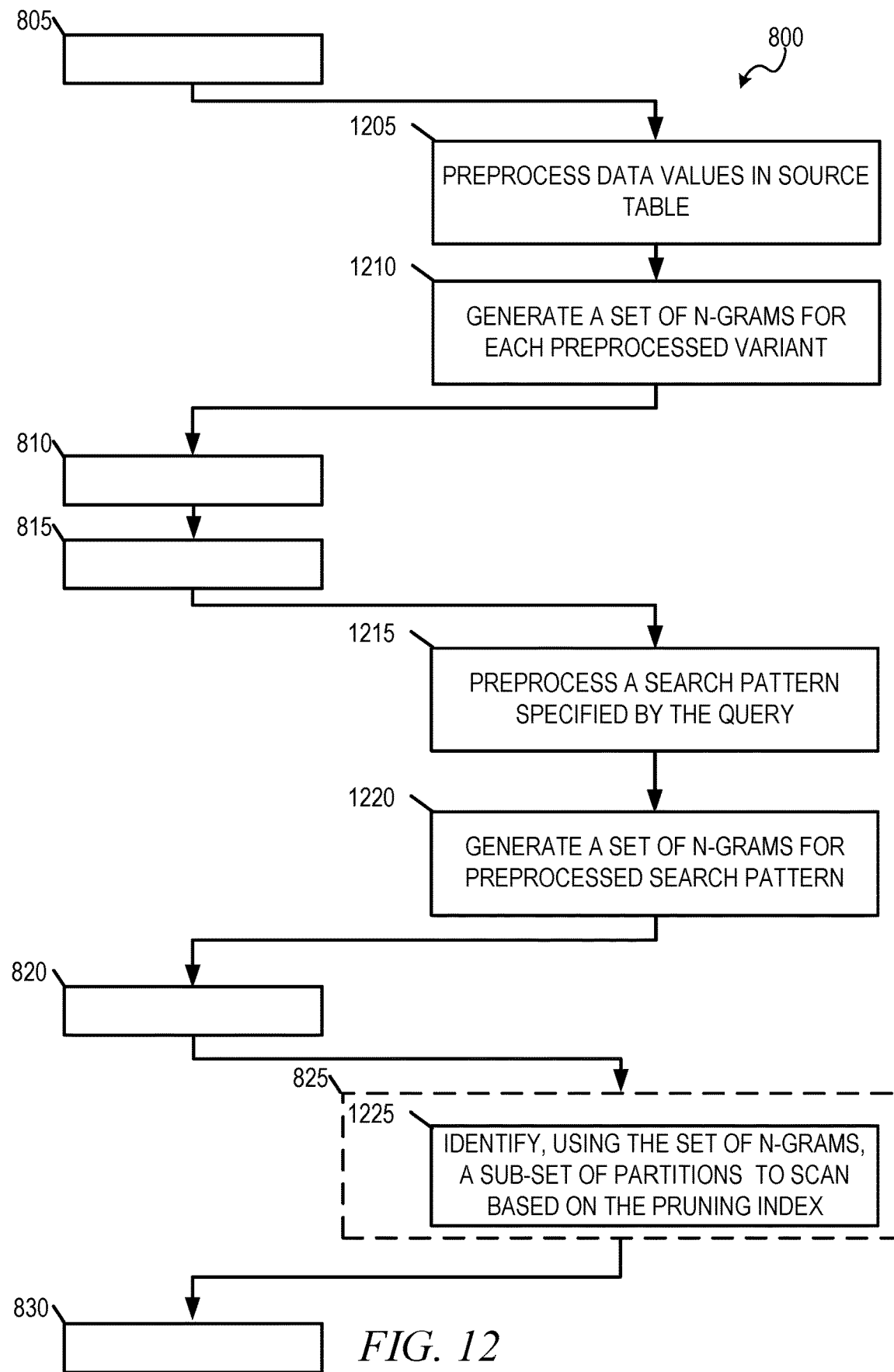

As shown in FIG. 12, the method 800 may, in some embodiments, include operations 1205, 1210, 1215, 1220, and 1225. Consistent with these embodiments, the operations 1205 and 1210 may be performed prior to operation 810 where the compute service manager 108 generates the pruning index for the source table. At operation 1205, the compute service manager 108 preprocesses the data values in the cells of the source table. In preprocessing a given data value, the compute service manager 108 generates one or more preprocessed variants of the data value. In performing the preprocessing, the compute service manager performs one or more normalization operations to a given data value. The compute service manager 108 can utilize one of several known normalization techniques to normalize data values (e.g., normalization form canonical composition).

For a given data value, the preprocessing performed by the compute service manager 108 can include, for example, any one or more of: generating a case-agnostic variant (e.g., by converting uppercase characters to lowercase characters), generating one or more misspelled variants based on common or acceptable misspellings of the data value, and generating one or more synonymous variants corresponding to synonyms of the data value. In general, in generating a preprocessed variant (e.g., case-agnostic variant, misspelled variant, a synonymous variant or a variant with special characters to indicate a start and end to a data value), the compute service manager 108 uses a common knowledge base to transform a data value into one or more permutations of the original data value.

As an example of the foregoing, the string "Bob" can be transformed into to the case-agnostic variant "bob." As another example, the preprocessed variants of "bob" "bbo" and "obb" can be generated for the string "Bob" to account for misspellings.

At operation 1210, the compute service manager 108 generates a set of N-grams for each preprocessed variant. An N-gram in this context refers to a contiguous sequence of N-items (e.g., characters or words) in a given value. For a given preprocessed variant of a data value in the source table, the compute service manager 108 transforms the value into multiple segments of equal length. For example, for a string, the compute service manager 108 can transform the string into multiple sub-strings of N characters.

Depending on the embodiment, the value of N can be predetermined or dynamically computed at the time of generating the pruning index. In embodiments in which the value of N is precomputed, the compute service manager 108 determines an optimal value for N based on a data type of values in the source table. In some embodiments, multiple values of N can be used. That is, a first subset of N-grams can be generated using a first value for N and a second subset of N-grams can be created using a second value of N.

Consistent with these embodiments, the operations 1215 and 1220 can be performed prior to operation 820 where the compute service manager 108 prunes the scan set using the pruning index. At operation 1215, the compute service manager 108 preprocesses a search pattern included in the query. In preprocessing the search pattern, the compute service manager 108 performs the same preprocessing operations that are performed on the data values in the source table at 1205 to ensure that the characters of the search pattern fit the pruning index. Hence, in preprocessing the search pattern, the compute service manager 108 can perform any one or more of: generating a case-agnostic variant of the search pattern (e.g., by converting uppercase characters to lowercase characters), generating one or more misspelled variants based on common or acceptable misspellings of the search pattern, generating one or more synonymous variants corresponding to synonyms of the search pattern, and generating a variant that includes special characters to mark a start and end of the search pattern. In preprocessing a given pattern, the compute service manager 108 can generate one or more preprocessed variants of the search pattern. For example, the compute service manager 108 can generate any one or more of: a case-agnostic variant, misspelled variant, or a synonymous variant for the search pattern. As a further example, the compute service manager 108 can generate a variant that includes special characters to indicate a start and end of a search pattern (e.g., "AtestvalueS" for the search pattern "testvalue").

At operation 1220, the compute service manager 108 generates a set of N-grams for the search pattern based on the one or more preprocessed variants of the search pattern. The compute service manager 108 uses the same value for N that was used to generate the pruning index. In embodiments in which the compute service manager 108 uses multiple values for N in generating the pruning index, the compute service manager 108 uses the same values for generating the set of N-grams for the search pattern.

In an example, the query includes the following statement:

WHERE a ILIKE '%LoremIpsum%Dolor%Sit%Amet'

In this example, '%LoremIpsum%Dolor%Sit%Amet' is the search pattern, and in preprocessing the search pattern, the compute service manager 108 converts the search pattern to all lower case to create a case-agnostic variant: '%loremipsum%dolor%sit%amet'. The compute service manager 108 splits the search pattern into segments at the wild card positions, which, in this example, produces the following sub-strings: "loremipsum", "dolor", "sit", and "amet". Based on these sub-strings, the compute service manager 108 generates the following set of N-grams:

Set ["lorem", "oremi", "remip", "emips", "mipsu", "ipsum", "dolor"]

In this example N is 5, and thus the compute service manager 108 discards the sub-strings "sit" and "amet" as their length is less than 5.

As shown, consistent with these embodiments, the operation 1225 can be performed as part of the operation 825 where the compute service manager 108 prunes the scan set using the pruning index. At operation 1225, the compute service manager 108 uses the set of N-grams generated based on the search pattern to identify a subset of micro-portions of the source table to scan based on the pruning index. The compute service manager 108 may identify the subset of micro-partitions by generating a set of fingerprints based on the set of N-grams (e.g., by computing a hash for each N-gram), comparing the set of fingerprints to values included in the pruning index (e.g., fingerprints of stored data values in the source table), and identifying one or more values in the pruning index that match one or more fingerprints in the set of fingerprints generated based on the N-grams of the search pattern. Specifically, the compute service manager 108 identifies one or more micro-partitions that potentially store data that satisfies the query based on fingerprints of data values in the pruning index that match fingerprints in the set of fingerprints computed for the search pattern. That is, a fingerprint (e.g., hash value computed based on an N-gram of a preprocessed stored data value in the source table) in the pruning index that matches a fingerprint generated from an N-gram of the search pattern (e.g., a hash value computed based on the N-gram) indicates that matching data is potentially stored in a corresponding column of the micro-partition because the N-gram generated from the search pattern is stored in the column of the micro-partition. The corresponding micro-partition can be identified by the compute service manager 108 based on the matching fingerprint in the pruning index. Consistent with some embodiments, in identifying the subset of micro-partitions, the compute service manager 108 uses the pruning index to identify any micro-partitions that contain any one of the fingerprints generated from the search pattern N-grams, and from these micro-partitions, the compute service manager 108 then identifies the micro-partitions that contain all of the N-grams. That is, the compute service manager 108 uses the pruning index to identify a subset of micro-partitions that contain data matching all fingerprints generated based on the N-grams of the search pattern. For example, given fingerprints f1, f2, and f3, the compute service manager 108 uses the pruning index to determine: a first micro-partition and second micro-partition contain data corresponding to f1; the second micro-partition and a third micro-partition that contains data corresponding to f2; and the first, second, and third micro-partition contain data corresponding to f3. In this example, the compute service manager 108 selects only the second micro-partition for scanning based on the second micro-partition containing data that corresponds to all three fingerprints.

Figure 13:
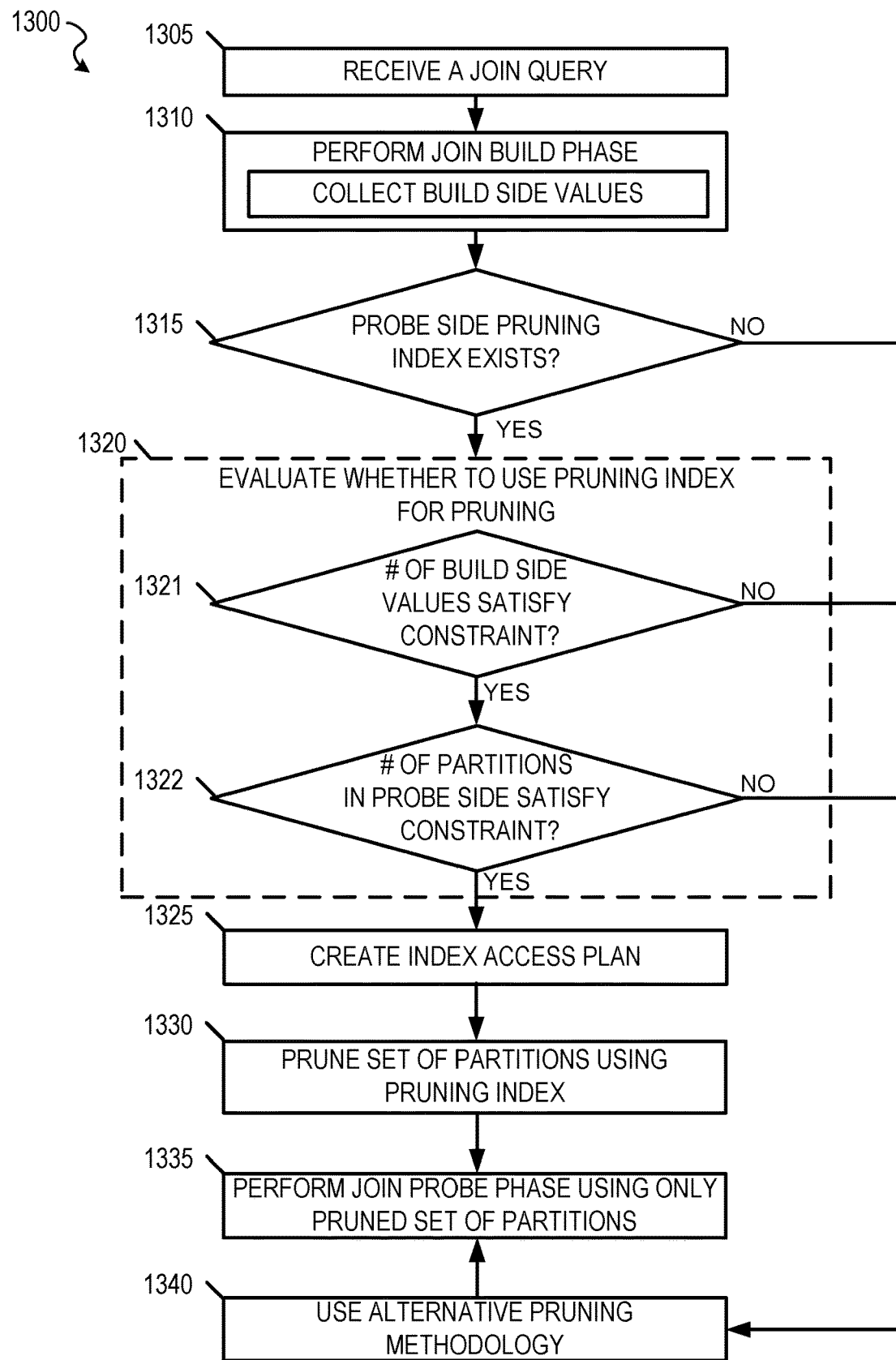
FIG. 13 is a flow diagram illustrating operations of the network-based database system in performing a method for processing a join query using a pruning index, in accordance with some embodiments.

FIG. 13 is a flow diagram illustrating operations of the network-based database system 102 in performing a method 1300 for processing a join query using a pruning index, in accordance with some embodiments. The method 1300 may be embodied in computer-readable instructions for execution by one or more hardware components (e.g., one or more processors) such that the operations of the method 1300 may be performed by components of database system 102. Accordingly, the method 1300 is described below, by way of example with reference thereto. However, it shall be appreciated that the method 1300 may be deployed on various other hardware configurations and is not intended to be limited to deployment within the database system 102.

Depending on the embodiment, an operation of the method 1300 may be repeated in different ways or involve intervening operations not shown. Though the operations of the method 1300 may be depicted and described in a certain order, the order in which the operations are performed may vary among embodiments, including performing certain operations in parallel or performing sets of operations in separate processes.

At operation 1305, the compute service manager 108 receives a join query to combine rows from a first and second table. An example join query is addressed above in reference to method 800.

At runtime, the execution platform 110 performs a join build phase (operation 1310) in response to receiving the join query. During the join build phase, the execution platform 110 builds a hash table where rows from the build side table (e.g., the smaller of the two tables) are stored using the join attribute(s) as a hash key. In building the hash table, the execution platform 110 collects a set of build side values (e.g., the values to be matched against the probe side table) for the join predicate.

At operation 1315, the execution platform 110 evaluates whether a pruning index for the probe side table (e.g., the larger of the two tables) exists. If so, the method 1300 advances to operation 1320 where the execution platform 110 determines whether to use the pruning index for pruning in processing the query. In doing so, the execution platform 110 uses a cost function to evaluate the use of the pruning index. If the cost associated with using the pruning index is too high (e.g., the cost exceeds a predetermined cost threshold), the execution platform 110 does not use the pruning index. Otherwise, the execution platform 110 uses the pruning index to prune the set of micro-partitions to scan for data matching the query.

As shown, in some embodiments, the evaluation performed at operation 1320 can include operations 1321 and 1322. At operation 1321, the execution platform 110 determines whether a number of values in build side values satisfies a threshold constraint. In determining whether the number of values satisfies the threshold constraint, the execution platform 110 may compare the number of values in the set to a threshold number, and if the number of values in the set does not exceed the threshold number, the execution platform 110 determines the number of values in the set satisfies the threshold constraint. If the number of values in the set satisfies the threshold constraint, the method 1300 advances to operation 1322 where the execution platform 110 determines whether the number of micro-partitions in the probe side table satisfies a threshold constraint. In determining whether the number of micro-partitions satisfies the threshold constraint, the execution platform 110 may compare the number of micro-partitions in the probe side table to a threshold number of micro-partitions, and if the number of micro-partitions does not exceed the threshold number, the execution platform 110 determines the number of micro-partitions in the set satisfies the threshold constraint.

If the execution platform 110 decides to use the pruning index based on the cost function (e.g., if the number of build side values satisfies the threshold constraint and if the number of micro-partitions in the table satisfies the threshold constraint), the execution platform 110 generates an index access plan based on the set of build side values, at operation 1325. The index access plan identifies the pruning index and specifies the set of build side values to compare against the pruning index to determine the reduced scan set. In some embodiments, the execution platform 110 may, as part of generating the access plan, generate a data structure based on the set of values. As a non-limiting example, the data structure can be a list of the values.

Based on the index access plan, the execution platform 110 prunes a set of micro-partitions of the probe side table using the pruning index, at operation 1330. That is, the execution platform 110 uses the pruning index to identify a subset of micro-partitions of the probe side table to scan based on the index access plan. For example, the execution platform 110 may generate one or more fingerprints for each value in the set of values (e.g., by computing a hash over the values) and compare the computed fingerprints to the pruning index to identify a reduced scan set comprising only a subset of the micro-partitions of the probe side table in which data that satisfies the query is potentially stored.

At operation 1335, the execution platform 110 performs a probe phase using only the subset of micro-partitions. During the probe phase, one or more execution nodes of the execution platform 110 read rows from the reduced scan set of the probe side table and probes the hash table for matching rows using a join attribute as the lookup key. For each match that is identified, a joined row is returned.

As shown, if the pruning index for the probe side table does not exist or if the execution platform 110 decides not to use the pruning index based on the cost function (e.g., if the number of values in the set of build side values does not satisfy the constraint, and/or if the number of micro-partitions in the probe side table does not satisfy the constraint), the method 1300 moves to operation 1340 where the execution platform 110 uses an alternative pruning methodology such as join pruning.

Described implementations of the subject matter can include one or more features, alone or in combination as illustrated below by way of example.

Example 1 is a database system comprising: at least one hardware processor; and at least one memory storing instructions that cause the at least one hardware processor to perform operations comprising: receiving a query directed at a table organized into a set of batch units, the query comprising a predicate for which values are unknown prior to runtime; determining a set of values for the predicate based on the query; creating an index access plan based on the set of values; based on the index access plan, pruning the set of batch units using a pruning index associated with the table, the pruning index comprising a set of filters that index distinct values in each column of the table, the pruning of the set of batch units comprising identifying a subset of batch units to scan for data that satisfies the query; and scanning the subset of batch units of the table to identify data that satisfies the query.

Example 2 includes the system of Example 1, wherein the operations further comprise: evaluating whether to use the pruning index in pruning the set of batch units based on a cost function.

Example 3 includes the system of any one or more of Examples 1 or 2, wherein the evaluating whether to use the pruning index in pruning the set of batch units comprises: determining whether the set of values satisfy a threshold size constraint, wherein the pruning of the set of batch units using the pruning index is based on determining the set of values satisfy the threshold size constraint.

Example 4 includes the system of any one or more of Examples 1-3, wherein the evaluating whether to use the pruning index in pruning the set of batch units comprises: determining whether the set of batch units satisfy a threshold size constraint, wherein the pruning of the set of batch units using the pruning index is based on determining the set of batch units satisfy the threshold size constraint.

Example 5 includes the system of any one or more of Examples 1-4, wherein the creating of the index access plan comprises generating a data structure based on the set of values.

Example 6 includes the system of any one or more of Examples 1-5, wherein: the table is a first table; the query comprises a join clause to combine rows from the first table and a second table; determining the set of values comprises collecting build-side values based on performing a build phase in response to the join clause being included in the query; and the scanning of the subset of batch units is performed as part of a join probe phase.

Example 7 includes the system of any one or more of Examples 1-6, wherein the determining of the set of values for the predicate comprises executing a subquery within the query.

Example 8 includes the system of any one or more of Examples 1-7, wherein the operations further comprise: generating the pruning index based on the table in an offline process prior to receiving the query.

Example 9 includes the system of any one or more of Examples 1-8, wherein: generating the pruning index comprises generating a filter for each batch unit of the set of batch units in the table; and the generating of the filter for each batch unit comprises generating a first filter for a first batch unit by performing operations comprising: for a given data value in the first batch unit, generating at least one fingerprint for the data value; and populating the first filter using the at least one fingerprint for the data value.

Example 10 includes the system of any one or more of Examples 1-9, wherein: determining the set of values for the predicate is performed at runtime; and pruning the set of batch units is performed at runtime.

Example 11 is a method comprising: receiving a query directed at a table organized into a set of batch units, the query comprising a predicate for which values are unknown prior to runtime; determining a set of values for the predicate based on the query; creating an index access plan based on the set of values; based on the index access plan, pruning the set of batch units using a pruning index associated with the table, the pruning index comprising a set of filters that index distinct values in each column of the table, the pruning of the set of batch units comprising identifying a subset of batch units to scan for data that satisfies the query; and scanning the subset of batch units of the table to identify data that satisfies the query.

Example 12 includes the method of Example 11, wherein the operations further comprise: evaluating whether to use the pruning index in pruning the set of batch units based on a cost function.

Example 13 includes the method of any one or more of Examples 11 or 12, wherein the evaluating whether to use the pruning index in pruning the set of batch units comprises: determining whether the set of values satisfy a threshold size constraint, wherein the pruning of the set of batch units using the pruning index is based on determining the set of values satisfy the threshold size constraint.

Example 14 includes the method of any one or more of Examples 11-13, wherein the evaluating whether to use the pruning index in pruning the set of batch units comprises: determining whether the set of batch units satisfy a threshold size constraint, wherein the pruning of the set of batch units using the pruning index is based on determining the set of batch units satisfy the threshold size constraint.

Example 15 includes the method of any one or more of Examples 11-14, wherein the creating of the index access plan comprises generating a data structure based on the set of values.

Example 16 includes the method of any one or more of Examples 11-15, wherein: the table is a first table; the query comprises a join clause to combine rows from the first table and a second table; determining the set of values comprises collecting build-side values based on performing a build phase in response to the join clause being included in the query; and the scanning of the subset of batch units is performed as part of a join probe phase.

Example 17 includes the method of any one or more of Examples 11-16, wherein the determining of the set of values for the predicate comprises executing a subquery within the query.

Example 18 includes the method of any one or more of Examples 11-17, and further includes: generating the pruning index based on the table in an offline process prior to receiving the query.

Example 19 includes the method of any one or more of Examples 11-18, wherein: generating the pruning index comprises generating a filter for each batch unit of the set of batch units in the table; and the generating of the filter for each batch unit comprises generating a first filter for a first batch unit by performing operations comprising: for a given data value in the first batch unit, generating at least one fingerprint for the data value; and populating the first filter using the at least one fingerprint for the data value.

Example 20 includes the method of any one or more of Examples 11-19, wherein: determining the set of values for the predicate is performed at runtime; and pruning the set of batch units is performed at runtime.

Example 21 is a computer-storage medium storing instructions that cause at least one hardware processor to perform operations comprising: receiving a query directed at a table organized into a set of batch units, the query comprising a predicate for which values are unknown prior to runtime; determining, at runtime, a set of values for the predicate based on the query; creating an index access plan based on the set of values; based on the index access plan, pruning, at runtime, the set of batch units using a pruning index associated with the table, the pruning index comprising a set of filters that index distinct values in each column of the table, the pruning of the set of batch units comprising identifying a subset of batch units to scan for data that satisfies the query; and scanning the subset of batch units of the table to identify data that satisfies the query.

Example 22 includes the computer-storage medium of Example 21, wherein the operations further comprise: evaluating whether to use the pruning index in pruning the set of batch units based on a cost function.

Example 23 includes the computer-storage medium of any one or more of Examples 21 or 22, wherein the evaluating whether to use the pruning index in pruning the set of batch units comprises: determining whether the set of values satisfy a threshold size constraint, wherein the pruning of the set of batch units using the pruning index is based on determining the set of values satisfy the threshold size constraint.

Example 24 includes the computer-storage medium of any one or more of Examples 21-23, wherein the evaluating whether to use the pruning index in pruning the set of batch units comprises: determining whether the set of batch units satisfy a threshold size constraint, wherein the pruning of the set of batch units using the pruning index is based on determining the set of batch units satisfy the threshold size constraint.

Example 25 includes the computer-storage medium of any one or more of Examples 21-24, wherein the creating of the index access plan comprises generating a data structure based on the set of values.

Example 26 includes the computer-storage medium of any one or more of Examples 21-25, wherein: the table is a first table; the query comprises a join clause to combine rows from the first table and a second table; determining the set of values comprises collecting build-side values based on performing a build phase in response to the join clause being included in the query; and the scanning of the subset of batch units is performed as part of a join probe phase.

Example 27 includes the computer-storage medium of any one or more of Examples 21-26, wherein the determining of the set of values for the predicate comprises executing a subquery within the query.

Example 28 includes the computer-storage medium of any one or more of Examples 21-27, wherein the operations further comprise: generating the pruning index based on the table in an offline process prior to receiving the query.

Example 29 includes the computer-storage medium of any one or more of Examples 21-28, wherein: generating the pruning index comprises generating a filter for each batch unit of the set of batch units in the table; and the generating of the filter for each batch unit comprises generating a first filter for a first batch unit by performing operations comprising: for a given data value in the first batch unit, generating at least one fingerprint for the data value; and populating the first filter using the at least one fingerprint for the data value.

Example 30 includes the computer-storage medium of any one or more of Examples 21-29, wherein: determining the set of values for the predicate is performed at runtime; and pruning the set of batch units is performed at runtime.

Figure 14:
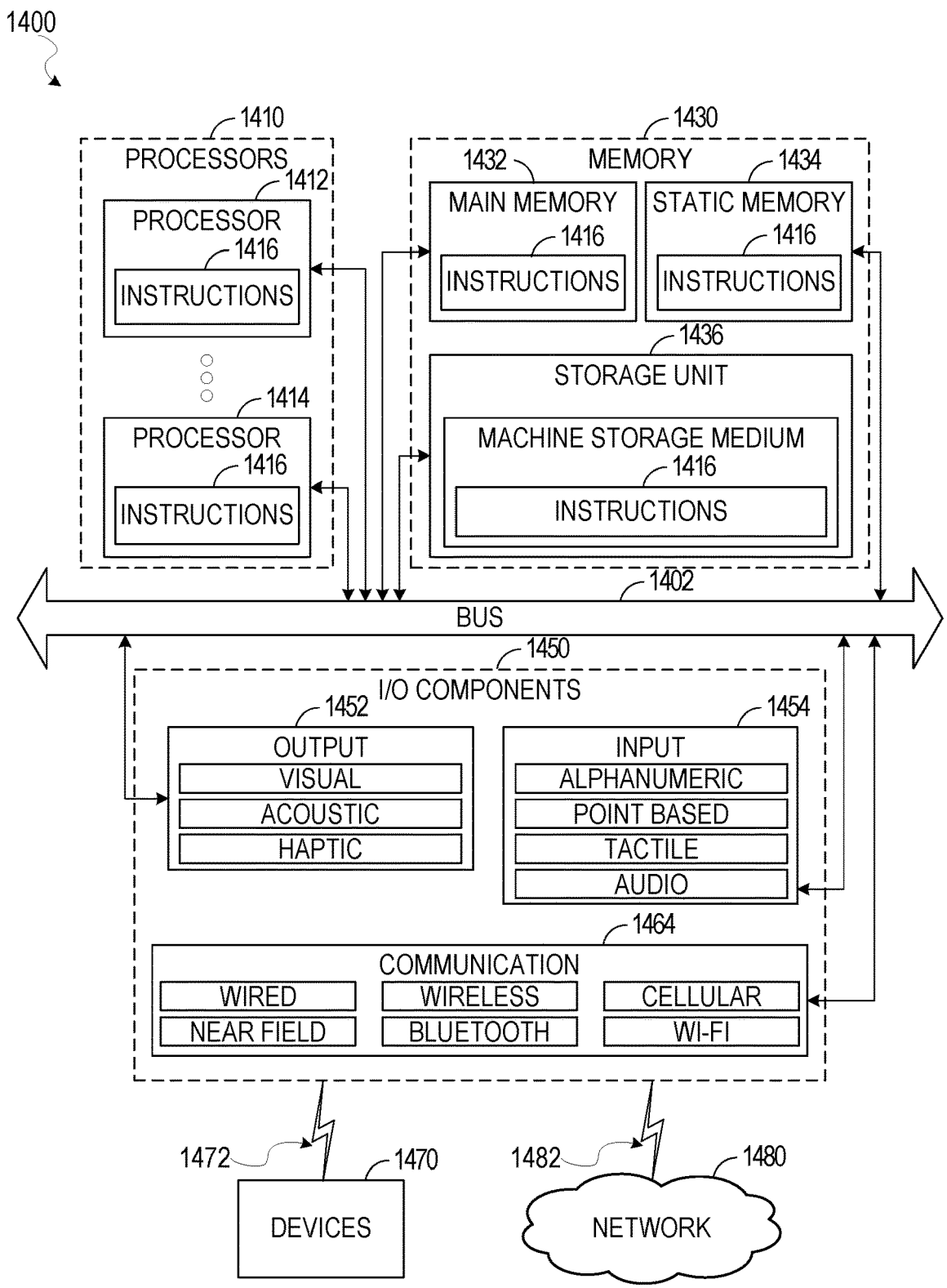
FIG. 14 illustrates a diagrammatic representation of a machine in the form of a computer system within which a set of instructions may be executed for causing the machine to perform any one or more of the methodologies discussed herein, in accordance with some embodiments of the present disclosure.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute any one or more operations of any one or more of the methods 800 or 1300. As another example, the instructions 1416 may cause the machine 1400 to implement portions of the functionality illustrated in any one or more of FIGS. 4-8. In this way, the instructions 1416 transform a general, non-programmed machine into a particular machine 1400 (e.g., the compute service manager 108, the execution platform 110, and the data storage devices 206) that is specially configured to carry out any one of the described and illustrated functions in the manner described herein.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 includes processors 1410, memory 1430, and input/output (I/O) components 1450 configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors 1410 that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 include components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, and other communication components to provide communication via other modalities. The devices 1470 may be another machine or any of a wide variety of peripheral devices (e.g., a peripheral device coupled via a universal serial bus (USB)). For example, as noted above, the machine 1400 may correspond to any one of the compute service manager 108, the execution platform 110, and the devices 1470 may include the data storage device 206 or any other computing device described herein as being in communication with the network-based database system 102 or the storage platform 104.

The various memories (e.g., 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 800 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   receiving a query directed at a table organized into a set of batch units, the query comprising a predicate for which values are unknown prior to runtime;
   determining a set of values for the predicate based on the query;
   creating an index access plan based on the set of values;
   based on the index access plan, pruning the set of batch units using a pruning index associated with the table, the pruning index comprising a set of filters that index distinct values in each column of the table, each filter in the set of filters corresponding to a batch unit in the set of batch units and being represented in the pruning index as an array with multiple dimensions, the pruning of the set of batch units comprising identifying a subset of batch units to scan for data that satisfies the query; and
   scanning the subset of batch units of the table to identify data that satisfies the query.

2. The system of claim 1, wherein the operations further comprise:
   evaluating whether to use the pruning index in pruning the set of batch units based on a cost function.

3. The system of claim 2, wherein the evaluating whether to use the pruning index in pruning the set of batch units comprises:
 determining whether the set of values satisfy a threshold size constraint, wherein the pruning of the set of batch units using the pruning index is based on determining the set of values satisfy the threshold size constraint.

4. The system of claim 2, wherein the evaluating whether to use the pruning index in pruning the set of batch units comprises:
 determining whether the set of batch units satisfy a threshold size constraint, wherein the pruning of the set of batch units using the pruning index is based on determining the set of batch units satisfy the threshold size constraint.

5. The system of claim 1, wherein the creating of the index access plan comprises generating a data structure based on the set of values.

6. The system of claim 1, wherein:
 the table is a first table;
 the query comprises a join clause to combine rows from the first table and a second table;
 determining the set of values comprises collecting build-side values based on performing a build phase in response to the join clause being included in the query; and
 the scanning of the subset of batch units is performed as part of a join probe phase.

7. The system of claim 1, wherein the determining of the set of values for the predicate comprises executing a subquery within the query.

8. The system of claim 1, wherein the operations further comprise:
 generating the pruning index based on the table in an offline process prior to receiving the query.

9. The system of claim 8, wherein:
 generating the pruning index comprises generating a filter for each batch unit of the set of batch units in the table; and
 the generating of the filter for each batch unit comprises generating a first filter for a first batch unit by performing operations comprising:
 for a given data value in the first batch unit, generating at least one fingerprint for the data value; and
 populating the first filter using the at least one fingerprint for the data value.

10. The system of claim 1, wherein:
 determining the set of values for the predicate is performed at runtime; and
 pruning the set of batch units is performed at runtime.

11. A method comprising:
 receiving a query directed at a table organized into a set of batch units, the query comprising a predicate for which values are unknown prior to runtime;
 determining a set of values for the predicate based on the query;
 creating an index access plan based on the set of values;
 based on the index access plan, pruning the set of batch units using a pruning index associated with the table, the pruning index comprising a set of filters that index distinct values in each column of the table, each filter in the set of filters corresponding to a batch unit in the set of batch units and being represented in the pruning index as an array with multiple dimensions, the pruning of the set of batch units comprising identifying a subset of batch units to scan for data that satisfies the query; and
 scanning the subset of batch units of the table to identify data that satisfies the query.

12. The method of claim 11, further comprising:
 evaluating whether to use the pruning index in pruning the set of batch units based on a cost function.

13. The method of claim 12, wherein the evaluating whether to use the pruning index in pruning the set of batch units comprises:
 determining whether the set of values satisfy a threshold size constraint, wherein the pruning of the set of batch units using the pruning index is based on determining the set of values satisfy the threshold size constraint.

14. The method of claim 12, wherein the evaluating whether to use the pruning index in pruning the set of batch units comprises:
 determining whether the set of batch units satisfy a threshold size constraint, wherein the pruning of the set of batch units using the pruning index is based on determining the set of batch units satisfy the threshold size constraint.

15. The method of claim 11, wherein the creating of the index access plan comprises generating a data structure based on the set of values.

16. The method of claim 11, wherein:
 the table is a first table;
 the query comprises a join clause to combine rows from the first table and a second table;
 determining the set of values comprises collecting build-side values based on performing a build phase in response to the join clause being included in the query; and
 the scanning of the subset of batch units is performed as part of a join probe phase.

17. The method of claim 11, wherein the determining of the set of values for the predicate comprises executing a subquery within the query.

18. The method of claim 11, further comprising:
 generating the pruning index based on the table in an offline process prior to receiving the query.

19. The method of claim 18, wherein:
 generating the pruning index comprises generating a filter for each batch unit of the set of batch units in the table; and
 the generating of the filter for each batch unit comprises generating a first filter for a first batch unit by performing operations comprising:
 for a given data value in the first batch unit, generating at least one fingerprint for the data value; and
 populating the first filter using the at least one fingerprint for the data value.

20. The method of claim 11, wherein:
 determining the set of values for the predicate is performed at runtime; and
 pruning the set of batch units is performed at runtime.

21. A computer-storage medium comprising instructions that, when executed by one or more processors of a machine, configure the machine to perform operations comprising:
 receiving a query directed at a table organized into a set of batch units, the query comprising a predicate for which values are unknown prior to runtime;
 determining a set of values for the predicate based on the query;
 creating an index access plan based on the set of values;
 based on the index access plan, pruning, at runtime, the set of batch units using a pruning index associated with the table, the pruning index comprising a set of filters that index distinct values in each column of the table, each filter in the set of filters corresponding to a batch unit in the set of batch units and being represented in the pruning index as an array with multiple dimensions, the pruning of the set of batch units comprising identifying a subset of batch units to scan for data that satisfies the query; and scanning the subset of batch units of the table to identify data that satisfies the query.

22. The computer-storage medium of claim 21, wherein the operations further comprise:

evaluating whether to use the pruning index in pruning the set of batch units based on a cost function.

23. The computer-storage medium of claim 22, wherein the evaluating whether to use the pruning index in pruning the set of batch units comprises:

determining whether the set of values satisfy a threshold size constraint, wherein the pruning of the set of batch units using the pruning index is based on determining the set of values satisfy the threshold size constraint.

24. The computer-storage medium of claim 22, wherein the evaluating whether to use the pruning index in pruning the set of batch units comprises:

determining whether the set of batch units satisfy a threshold size constraint, wherein the pruning of the set of batch units using the pruning index is based on determining the set of batch units satisfy the threshold size constraint.

25. The computer-storage medium of claim 21, wherein the creating of the index access plan comprises generating a data structure based on the set of values.

26. The computer-storage medium of claim 21, wherein:
the table is a first table;
the query comprises a join clause to combine rows from the first table and a second table;
determining the set of values comprises collecting build-side values based on performing a build phase in response to the join clause being included in the query; and
the scanning of the subset of batch units is performed as part of a join probe phase.

27. The computer-storage medium of claim 21, wherein the determining of the set of values for the predicate comprises executing a subquery within the query.

28. The computer-storage medium of claim 21, wherein the operations further comprise:

generating the pruning index based on the table in an offline process prior to receiving the query.

29. The computer-storage medium of claim 28, wherein:
generating the pruning index comprises generating a filter for each batch unit of the set of batch units in the table; and
the generating of the filter for each batch unit comprises generating a first filter for a first batch unit by performing operations comprising:
for a given data value in the first batch unit, generating at least one fingerprint for the data value; and
populating the first filter using the at least one fingerprint for the data value.

30. The computer-storage medium of claim 21, wherein:
determining the set of values for the predicate is performed at runtime; and
pruning the set of batch units is performed at runtime.

* * * * *